(12) United States Patent
Shimizu et al.

(10) Patent No.: US 8,625,706 B2
(45) Date of Patent: Jan. 7, 2014

(54) SIGNAL PROCESSING APPARATUS, INFORMATION PROCESSING APPARATUS, MULTILEVEL CODING METHOD, AND DATA TRANSMISSION METHOD

(75) Inventors: Tatsuo Shimizu, Chiba (JP); Takehiro Sugita, Kanagawa (JP)

(73) Assignee: Sony Corporation, Tokyo (JP)

( * ) Notice: Subject to any disclaimer, the term of this patent is extended or adjusted under 35 U.S.C. 154(b) by 853 days.

(21) Appl. No.: 12/784,026

(22) Filed: May 20, 2010

(65) Prior Publication Data

US 2010/0329381 A1     Dec. 30, 2010

(30) Foreign Application Priority Data

Jun. 30, 2009    (JP) ................................ 2009-156043

(51) Int. Cl.
*H04L 25/49* (2006.01)
(52) U.S. Cl.
USPC ............................ 375/293; 375/286; 375/295
(58) Field of Classification Search
USPC ......................................... 375/293, 286, 295
See application file for complete search history.

(56) References Cited

U.S. PATENT DOCUMENTS

| 5,908,154 A * | 6/1999 | Sunaga et al. ............... 236/49.3 |
| 2009/0285320 A1* | 11/2009 | Cameron et al. .............. 375/265 |
| 2010/0275092 A1* | 10/2010 | Ogiso ........................... 714/752 |

FOREIGN PATENT DOCUMENTS

JP      3-109843      5/1991

* cited by examiner

*Primary Examiner* — Leila Malek
(74) *Attorney, Agent, or Firm* — Oblon, Spivak, McClelland, Maier & Neustadt, L.L.P.

(57) ABSTRACT

Provided is a signal processing apparatus including an encoder for encoding, according to respective specific coding schemes, a first bit string formed from bit values at odd-numbered positions and a second bit string formed from bit values at even-numbered positions that are obtained by alternately extracting bit values from a bit string that is expressed by mutually different first and second bit values, and generating first and second encoded signals that do not include a DC component, and a signal generation unit for generating a multilevel signal by respectively adding, to a clock signal having larger amplitude than the first and second encoded signals that are generated by the encoder, the first encoded signal in synchronization with a timing of the clock signal being at a positive amplitude value and the second encoded signal in synchronization with a timing of the clock signal being at a negative amplitude value.

11 Claims, 21 Drawing Sheets

CONFIGURATION EXAMPLE OF AMPLITUDE
INFORMATION (VOLTAGE) DETECTION MEANS

CONFIGURATION EXAMPLE OF AMPLITUDE INFORMATION (DIGITAL) DETECTION NEANS

SEPARATE CODING SCHEME

FIG.15
COMPARISON OF MULTILEVEL SIGNAL WAVEFORMS
(SIMULATION RESULTS)
(A) MULTILEVEL SIGNAL GENERATED BY
ENCODING METHOD OF NEW SCHEME
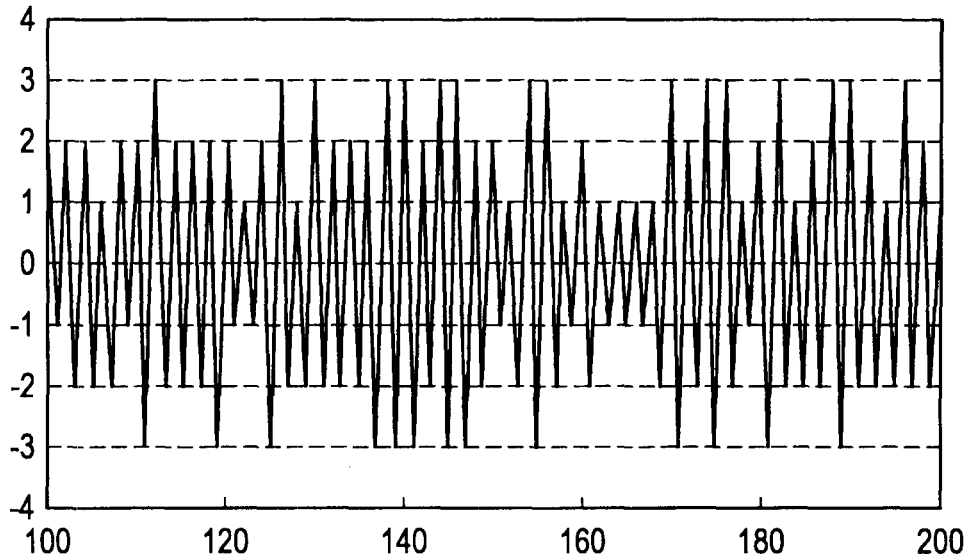
(B) MULTILEVEL SIGNAL GENERATED BY
SEPARATE CODING SCHEME
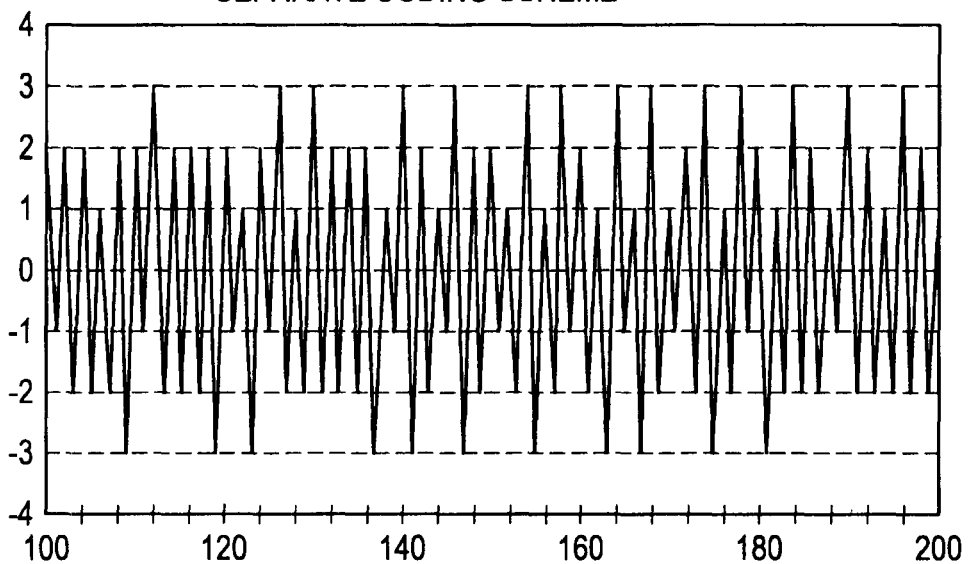

FIG.16
COMPARISON OF ABSOLUTE VALUE CIRCUIT
OUTPUT WAVEFORMS (SIMULATION RESULTS)
(A) ABSOLUTE VALUE CIRCUIT OUTPUT OF MULTILEVEL SIGNAL
GENERATED BY ENCODING METHOD OF NEW SCHEME
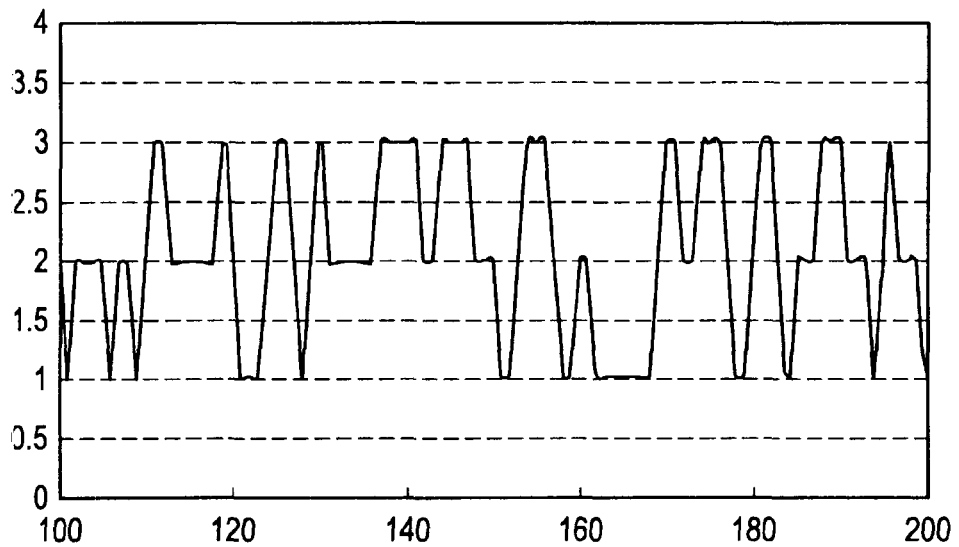
(B) ABSOLUTE VALUE CIRCUIT OUTPUT OF MULTILEVEL
SIGNAL GENERATED BY SEPARATE CODING SCHEME
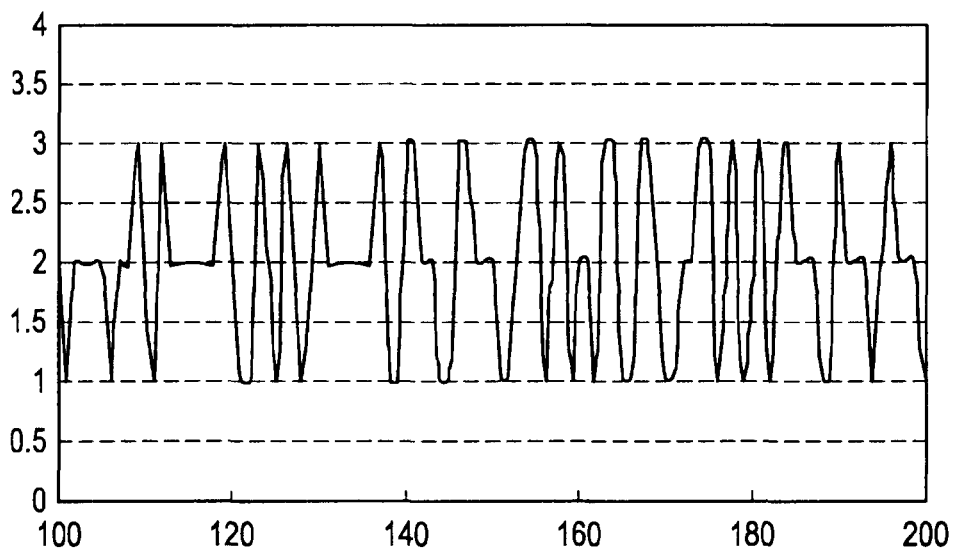

FIG.17
COMPARISON OF LPF OUTPUT WAVEFORMS
(SIMULATION RESULTS)
(A) LPF OUTPUT OF MULTILEVEL SIGNAL GENERATED
BY ENCODING METHOD OF NEW SCHEME
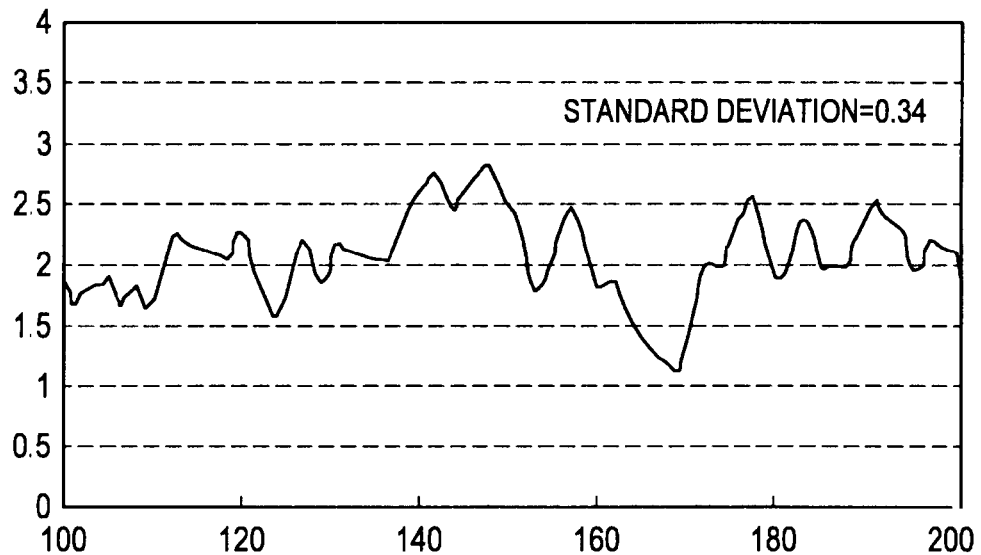
(B) LPF OUTPUT OF MULTILEVEL SIGNAL
GENERATED BY SEPARATE CODING SCHEME
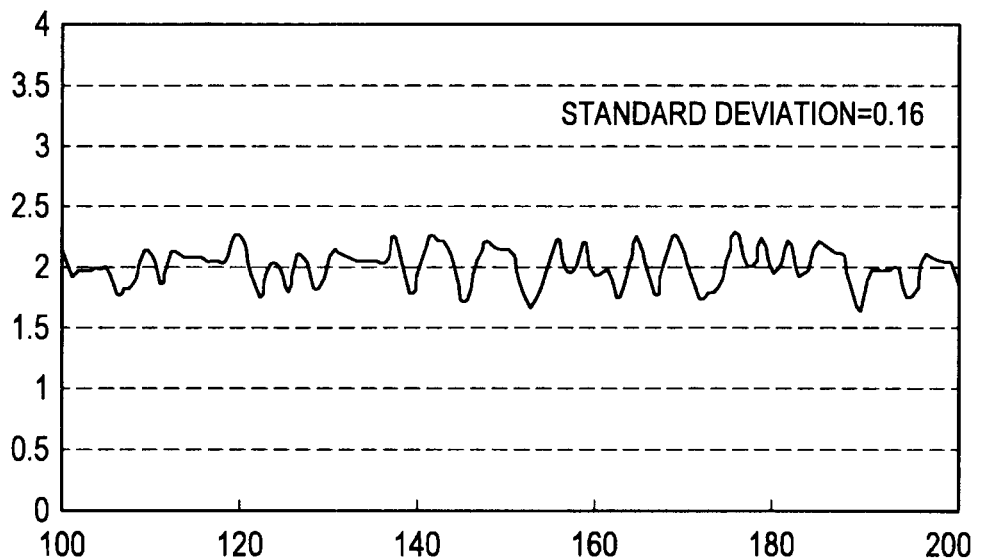

FIG.21
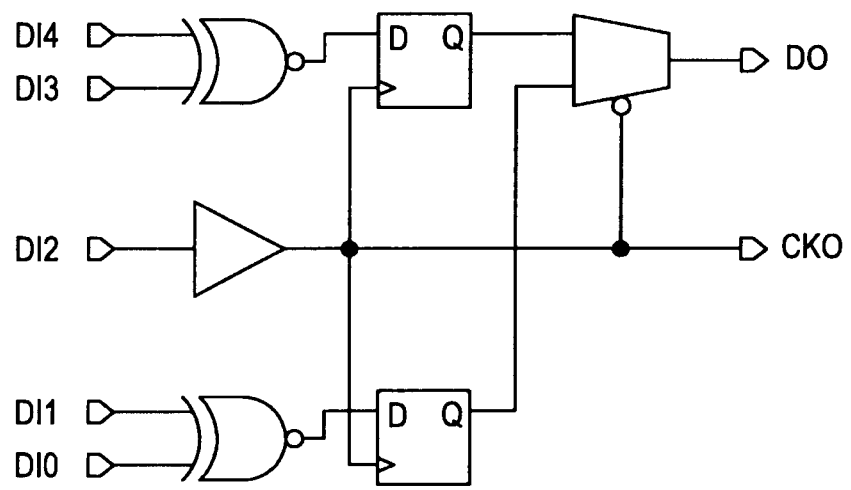
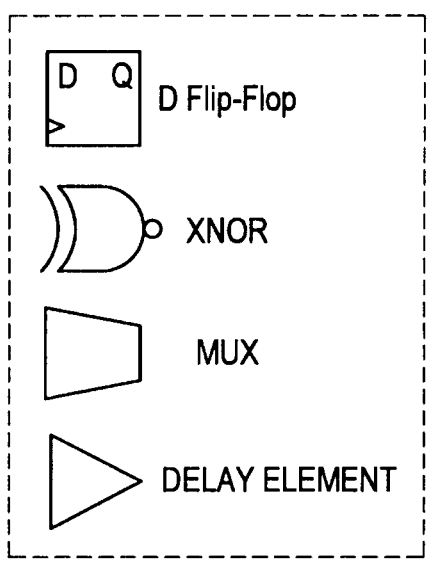

SIGNAL PROCESSING APPARATUS, INFORMATION PROCESSING APPARATUS, MULTILEVEL CODING METHOD, AND DATA TRANSMISSION METHOD

BACKGROUND OF THE INVENTION

1. Field of the Invention

The present invention relates to a signal processing apparatus, an information processing apparatus, a multilevel coding method, and a data transmission method.

2. Description of the Related Art

Most information processing apparatuses such as mobile phone and notebook personal computer (hereinafter, a notebook PC) use a movable member for a hinge portion connecting a main body to be operated by a user and a display portion on which information is displayed. However, a large number of signal lines and power lines pass through the hinge portion, and a method for maintaining reliability of the wiring is desired. Reducing the number of the signal lines passing through the hinge portion comes first to mind. Therefore, data transmission processing between the main body and the display portion is made to be performed by using a serial transmission method instead of a parallel transmission method. When the serial transmission method is used, the number of signal lines is decreased.

In the serial transmission method, data is encoded and then transmitted. At that tune, for example, a Non Return to Zero (NRZ) coding scheme, a Manchester coding scheme, an Alternate Mark Inversion (AMI) coding scheme, or the like is used as the coding scheme. For example, JP-A-1991-109843 discloses a technology for transmitting data by using an AMI code, which is a representative example of a bipolar code. The patent document also discloses a technology according to which a data clock is transmitted after being expressed by an intermediate value of a signal level, and the receiving side regenerates the data clock based on the signal level.

SUMMARY OF THE INVENTION

However, in an information processing apparatus such as a notebook PC, even if the serial transmission method using the above code is used, the number of signal lines wired in the hinge portion is still large. For example, in a case of a notebook PC, there are wiring lines related to an LED backlight for illuminating an LCD in addition to video signals to be transmitted to the display portion, and thus several tens of signal lines including these signal lines are wired in the hinge portion. The LCD is an abbreviation for Liquid Crystal Display, and the LED is an abbreviation for Light Emitting Diode.

In view of such issue, a coding scheme (hereinafter, new scheme) has been recently developed according to which a DC component is not included and according to which a clock component can be easily extracted from a received signal. Since a transmission signal generated based on this new scheme does not include a DC component, it can be transmitted by being superimposed on DC power. Furthermore, by detecting the polarity inversion cycle of the transmission signal, a clock can be regenerated by the receiving side without using a PLL. Therefore, a plurality of signal lines can be combined together, and thereby the number of signal lines can be reduced and also the power consumption and the circuit scale can be reduced. The PLL is an abbreviation for Phase Locked Loop.

A transmission signal according to the new scheme described above is obtained by, for example, encoding NRZ data by an encoding method of removing a DC component, such an the AMI coding scheme or a partial response scheme, and synchronously adding a clock to the encode signal obtained by the encoding. At this time, a clock having a larger amplitude than the encoded signal is synchronously added. Thus, the transmission signal obtained by the synchronous addition will be a multilevel signal that uses a plurality of amplitude levels to express one bit value in the NRZ data. When using the multilevel signal, it is desired that the receiving side accurately performs comparison for each amplitude level of the multilevel signal to properly decode the data.

In many cases, loss in a transmission line connecting the transmitting side and the receiving side depends on the type of a cable that is used and the length of the cable that is used. Also, the amplitude level of the multilevel signal output from the transmitting side and a threshold level that is set for comparing each amplitude level of the multilevel signal at the receiving side are dependent on manufacturing variability and the like of parts provided in the transmitting side and the receiving side. For example, in addition to the manufacturing variability, there is a dependency on an operation condition, such as power-supply voltage, temperature and the like. Accordingly, the amplitude level corresponding to a certain bit value and the threshold level for comparing the amplitude level are not constant at all times. Thus, in view of the circumstances, it is desired to realize a signal transmission system robust against changes in the operation condition while increasing the degree of freedom in the system configuration.

In response to such request, the inventors of the present invention have devised a method of dynamically amplifying (or attenuating) the amplitude level of the multilevel signal at the receiving side. This method is for detecting amplitude information of the multilevel signal and adjusting a gain based on the detection result. An example may be a method of averaging absolute amplitude values of the multilevel signal over a specific period of time, and controlling the gain of the multilevel signal based on the time-averaged value (amplitude information). However, when using the multilevel signal according to the new scheme described above for the data transmission, the gain may not be appropriately controlled depending on a data pattern.

As described above, the multilevel signal according to the new scheme has a signal waveform that is obtained by synchronously adding a clock to an encoded signal. Thus, depending on the data pattern, a period of time in which the absolute amplitude value stays at an averagely low value and a period of time in which the absolute amplitude value stays at an averagely high value may occur. When such period of time exists and when the gain is adjusted based on the amplitude information obtained in the period of time, the multilevel signal after amplification may sometimes have an excessively large amplitude or an excessively small amplitude. That is, a gain control may not be properly performed for the multilevel signal. In view of such issue, a method can be conceived of scrambling the data pattern, at the transmitting side, for example. However, it is not effective if a data pattern that negates the scramble pattern occurs, and also, a mechanism for performing scrambling will be provided, thereby increasing the circuit scale to that extent.

Furthermore, to cope with a similar situation, JP-A-2000-165457, for example, discloses a method of detecting, for a known data pattern where change over time is slow such as a control signal and the like, a signal in a certain period of time and a period of time that includes a signal having an amplitude different from that of the signal mentioned above, and of performing gain control on a received signal based on amplitude information obtained in the period of time. However, this method is suitable for a known data pattern where change over time is slow such as a control signal, and it is extremely difficult to apply this method to data transmission of a multilevel signal according to the new scheme described above whose data pattern is unknown and for which change over time is fast. Furthermore, as another measure, JP-A-2003-158557 discloses a method of performing gain control on a signal by using a training signal. However, when using this method, time that can be used for data transmission decreases, and thus an effective data transmission rate is reduced to that extent.

In light of the foregoing, it is desirable to provide a signal processing apparatus, an information processing device, a multilevel coding method, and a data transmission method which are novel and improved, and which are capable of reducing dependency between a data pattern and a time-averaged amplitude value of a multilevel signal that has a signal waveform obtained by synchronously adding a clock to an encoded signal.

According to an embodiment of the present invention, there is provided a signal processing apparatus which includes an encoding unit for encoding, according to respective specific coding schemes, a first bit string formed from bit values at odd-numbered positions and a second bit string formed from bit values at even-numbered positions that are obtained by alternately extracting bit values from a bit string that is expressed by mutually different first and second bit values, and generating first and second encoded signals that do not include a DC component, and a signal generation unit for generating a multilevel signal by respectively adding, to a clock signal having larger amplitude than the first and second encoded signals that are generated by the encoding unit, the first encoded signal in synchronization with a timing of the clock signal being at a positive amplitude value and the second encoded signal in synchronization with a timing of the clock signal being at a negative amplitude value.

The signal processing apparatus may further include a signal transmitting unit for transmitting the multilevel signal generated by the signal generation unit through a specific transmission path, a signal receiving unit for receiving the multilevel signal transmitted through the specific transmission path, an amplitude detection unit for detecting an amplitude value of the multilevel signal received by the signal receiving unit, and a decoding unit for decoding the first bit string based on a positive amplitude value detected by the amplitude detection unit and decoding the second bit string based on a negative amplitude value.

Furthermore, the signal processing apparatus may further include a variable gain amplifier for amplifying an amplitude of the multilevel signal received by the signal receiving unit, and a gain control unit for controlling a gain of the variable gain amplifier. In this case, the amplitude detection unit detects an amplitude value of the multilevel signal whose amplitude is amplified by the variable gain amplifier, by using a specific threshold value that is determined based on the gain of the variable gain amplifier, and the gain control unit controls the gain of the variable gain amplifier in such a way that a time-averaged value of an absolute amplitude value of the multilevel signal output from the variable gain amplifier matches a reference amplitude value that is determined based on the specific threshold value.

Furthermore, the signal processing apparatus may further include a clock regeneration unit for detecting a polarity inversion cycle of the multilevel signal received by the signal receiving unit, and regenerating the clock signal based on the polarity inversion cycle. In this case, the decoding unit decodes the first and second bit strings based on the clock signal regenerated by the clock regeneration unit.

Furthermore, the signal processing apparatus may further include a reference average value calculation unit for modulating the reference amplitude value by the clock signal regenerated by the clock regeneration unit, and calculating a reference average value by time-averaging an absolute amplitude value of the modulation output by a same time constant as the time-averaged value of the absolute amplitude value of the multilevel signal. In this case, the gain control unit controls the gain of the variable gain amplifier such that the time-averaged value of the absolute amplitude value of the multilevel signal is a value near the reference average value calculated by the reference average value calculation unit.

Furthermore, the gain control unit may be configured from an absolute value circuit for generating the absolute amplitude value of the multilevel signal output from the variable gain amplifier, a filter circuit for generating the time-averaged value of the absolute amplitude value output from the absolute value circuit, and an operational amplifier to which the time-averaged value output from the filter circuit and the reference amplitude value are input, the operational amplifier being for outputting a control signal that reduces the gain of the variable gain amplifier in case the time-averaged value exceeds the reference amplitude value and increases the gain of the variable gain amplifier in case the time-averaged value falls below the reference amplitude value.

Furthermore, the specific coding scheme may be an AMI (Alternate Mark Inversion) coding scheme.

According to another embodiment of the present invention, there is provided an information processing apparatus which includes an encoding unit for encoding, according to respective specific coding schemes, a first bit string formed from bit values at odd-numbered positions and a second bit string formed from bit values at even-numbered positions that are obtained by alternately extracting bit values from a bit string that is expressed by mutually different first and second bit values, and generating first and second encoded signals that do not include a DC component, a signal generation unit for generating a multilevel signal by respectively adding, to a clock signal having larger amplitude than the first and second encoded signals that are generated by the encoding unit, the first encoded signal in synchronization with a timing of the clock signal being at a positive amplitude value and the second encoded signal in synchronization with a timing of the clock signal being at a negative amplitude value, and an arithmetic processing unit for outputting one or a plurality of pieces of data selected among image data, audio data, communication data, and control data. A bit string of the data output from the arithmetic processing unit is input to the encoding unit and the first and second encoded signals are generated. The first and second encoded signals are input to the signal generation unit and the multilevel signal is generated. The multilevel signal is transmitted through a specific transmission path provided within the information processing apparatus.

Furthermore, the information processing apparatus may further include a signal receiving unit for receiving the multilevel signal transmitted through the specific transmission path, an amplitude detection unit for detecting an amplitude value of the multilevel signal received by the signal receiving unit, a decoding unit for decoding the first bit string based on a positive amplitude value detected by the amplitude detection unit and decoding the second bit string based on a negative amplitude value, and a display unit for displaying the image data. In this case, when the data output by the arithmetic processing unit is the image data, the decoding unit inputs to the display unit the first and second bit strings corresponding to the image data, and the display unit displays the image data based on the first and second bit strings input by the decoding unit.

According to another embodiment of the present invention, there is provided a multilevel coding method including the steps of encoding, according to respective specific coding schemes, a first bit string formed from bit values at odd-numbered positions and a second bit string formed from bit values at even-numbered positions that are obtained by alternately extracting bit values from a bit string that is expressed by mutually different first and second bit values, and generating first and second encoded signals that do not include a DC component, and generating a multilevel signal by respectively adding, to a clock signal having larger amplitude than the first and second encoded signals that are generated in the step of encoding, the first encoded signal in synchronization with a timing of the clock signal being at a positive amplitude value and the second encoded signal in synchronization with a timing of the clock signal being at a negative amplitude value.

According to another embodiment of the present invention, there is provided a data transmission method including the steps of outputting, from an arithmetic processing apparatus, one or a plurality of pieces of data selected among image data, audio data, communication data, and control data, encoding, according to respective specific coding schemes, a first bit string formed from bit values at odd-numbered positions and a second bit string formed from bit values at even-numbered positions that are obtained by alternately extracting bit values from a bit string corresponding to the data output from the arithmetic processing apparatus in the step of outputting, and generating first and second encoded signals that do not include a DC component, generating a multilevel signal by respectively adding, to a clock signal having larger amplitude than the first and second encoded signals that are generated in the step of encoding, the first encoded signal in synchronization with a timing of the clock signal being at a positive amplitude value and the second encoded signal in synchronization with a timing of the clock signal being at a negative amplitude value, and transmitting the multilevel signal through a specific transmission path.

According to the embodiments of the present invention described above, dependency between a data pattern and a time-averaged amplitude value of a multilevel signal that has a signal waveform obtained by synchronously adding a clock to an encoded signal can be reduced.

BRIEF DESCRIPTION OF THE DRAWINGS

FIG. 15 is an explanatory diagram showing a result of comparison, by simulation, between a signal waveform of the multilevel signal according to the new scheme and a signal waveform of the multilevel signal according to the separate coding scheme of the present embodiment;

FIG. 16 is an explanatory diagram showing a result of comparison, by simulation, between an absolute value circuit output of the multilevel signal according to the new scheme and an absolute value circuit output of the multilevel signal according to the separate coding scheme of the present embodiment;

FIG. 17 is an explanatory diagram showing a result of comparison, by simulation, between an output of a LPF having the absolute value circuit output of the multilevel signal according to the new scheme as an input and an output of a LPF having the absolute value circuit output of the multilevel signal according to the separate coding scheme of the present embodiment as an input;

FIG. 21 is an explanatory diagram showing a configuration example of a decoder according to the present embodiment.

DETAILED DESCRIPTION OF THE EMBODIMENT(S)

Figure 1:
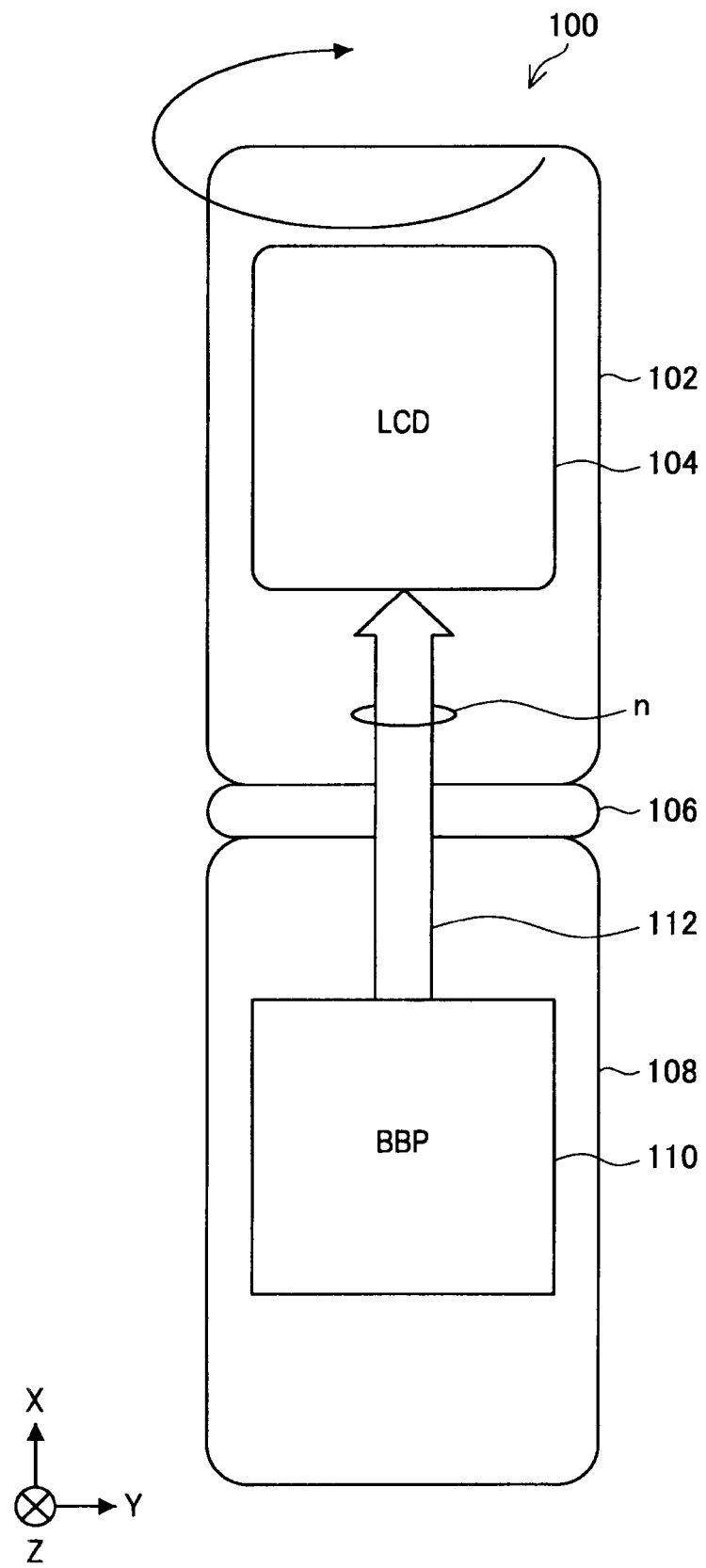
FIG. 1 is an explanatory diagram showing a configuration example of a mobile terminal adopting a parallel transmission scheme.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

<Flow of Description>

The flow of description of an embodiment of the present invention described below will be briefly mentioned. First, a device configuration of a mobile terminal 100 adopting a parallel transmission scheme will be briefly described with reference to FIG. 1. Herein, a demerit relating to the parallel transmission scheme will be pointed out. Then, a device configuration of a mobile terminal 130 adopting a serial transmission scheme will be briefly described with reference to FIG. 2. Then, a functional configuration of a mobile terminal 130 according to the new scheme described above will be described with reference to FIG. 3. Next, an encoding method according to the new scheme described above for which an AMI code serves as a base will be described with reference to FIGS. 4 and 5. Additionally, AMI is an abbreviation for Alternate Mark Inversion.

Figure 6:
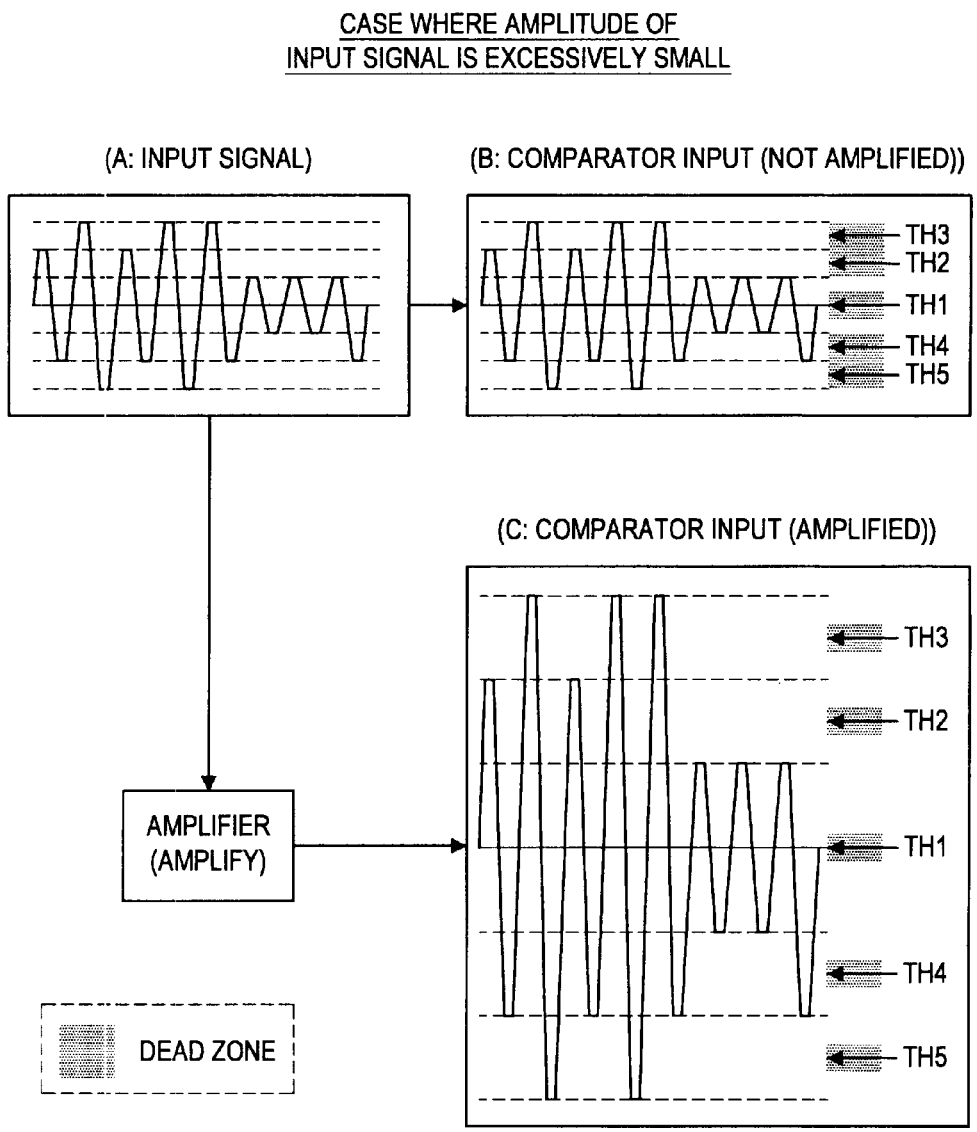
FIG. 6 is an explanatory diagram for explaining an issue arising in a case the amplitude of an input signal is excessively small at the receiving side and a solution to the issue.

Next, with reference to FIG. 6, there will be pointed out an issue arising in a case the amplitude of a multilevel signal is excessively small at the time of input of the multilevel signal to a comparator that is provided at the receiving side to detect each amplitude level and a clock component of the multilevel signal. Furthermore, with reference to FIG. 7, there will be pointed out an issue arising in a case the amplitude of a multilevel signal is excessively large at the time of input of the multilevel signal to a comparator that is provided at the receiving side to detect each amplitude level of the multilevel signal. Also, configuration examples of means for detecting amplitude information of a multilevel signal will be described with reference to FIGS. 8 and 9. Next, a measure taken to solve these issues will be described with reference to FIG. 10 while introducing a concrete configuration example of the receiving side.

Figure 10:
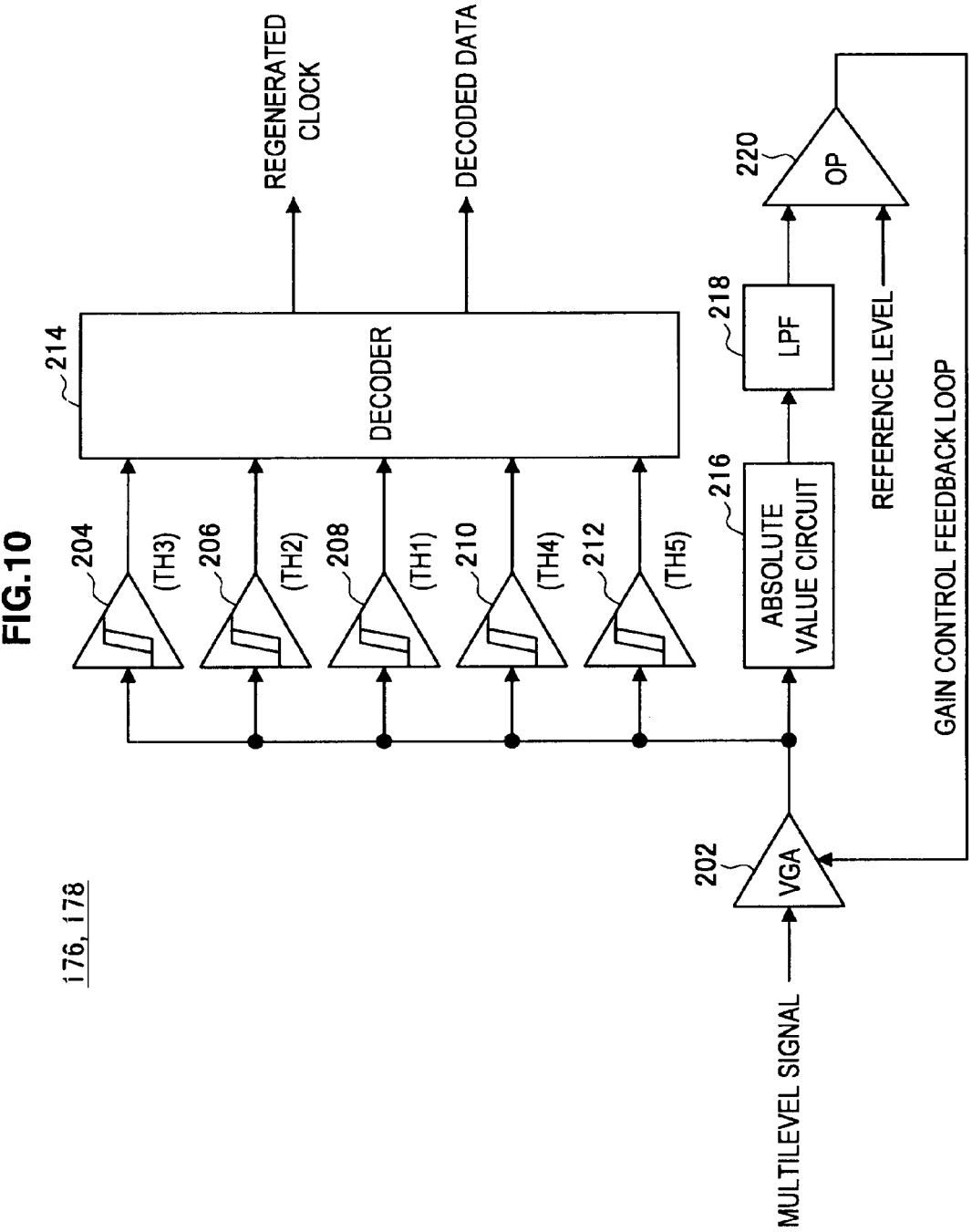
FIG. 10 is an explanatory diagram showing a configuration example of means for detecting each amplitude value and a clock component of a multilevel signal.
Figure 11:
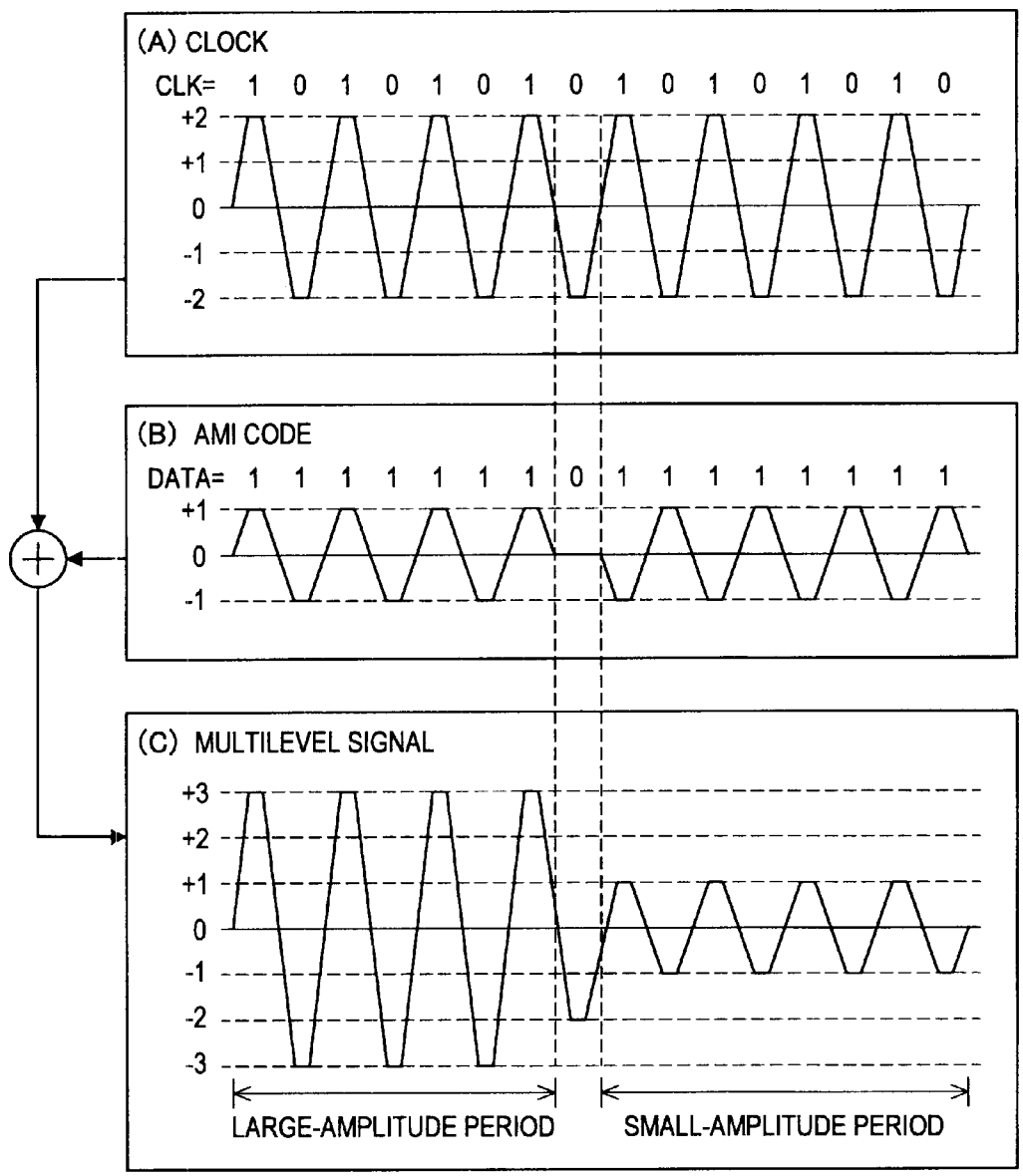
FIG. 11 is an explanatory diagram showing amplitude characteristics of a multilevel signal according to the new scheme.
Figure 12:
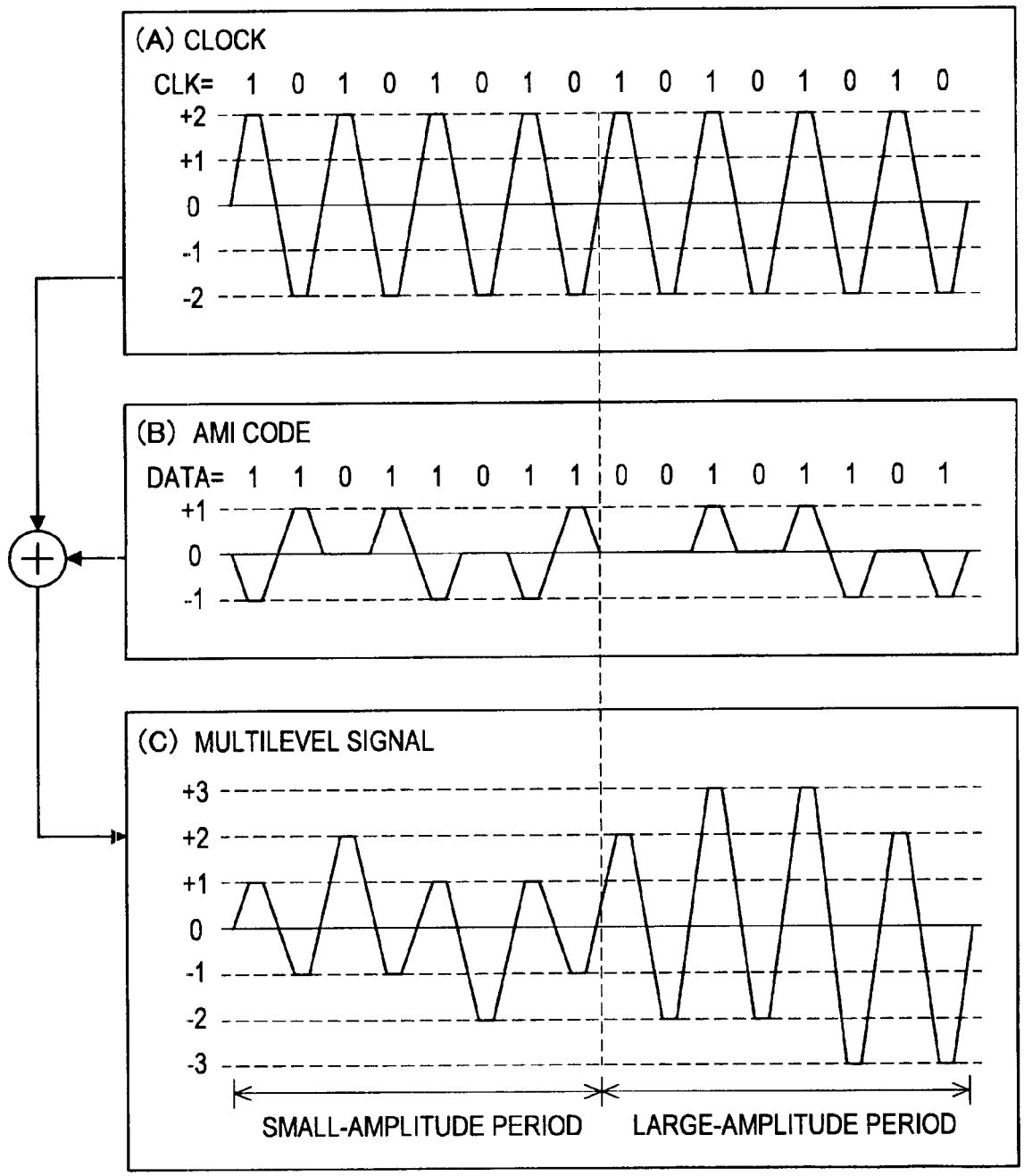
FIG. 12 is an explanatory diagram showing amplitude characteristics of a multilevel signal according to the new scheme.

Next, with reference to FIGS. 11 and 12, there will be pointed out an issue arising due to amplitude characteristics of a multilevel signal of the new scheme at the time of applying the configuration example of the receiving side shown in FIG. 10. Next, a separate coding scheme according to the present embodiment that is devised to solve the issue as mentioned above will be described with reference to FIG. 13. Next, amplitude characteristics of a multilevel code generated by the separate coding scheme according to the present embodiment will be described with reference to FIG. 14. Then, characteristics of the multilevel signal generated by the encoding method of the new scheme and characteristics of the multilevel signal generated by the separate coding scheme according to the present embodiment will be compared while referring to the simulation results shown in FIGS. 15 to 17. Then, configuration examples of means for detecting each amplitude level and a clock component of the multilevel signal generated by the separate coding scheme according to the present embodiment will be described with reference to FIGS. 18 to 21. Lastly, the technical idea of the embodiment will be summarized and operational effects obtained by the technical idea will be briefly described.

(Description Items)
1: Introduction
  1-1: Device Configuration of Mobile Terminal 100 adopting Parallel Transmission Scheme
  1-2: Device Configuration of Mobile Terminal 130 adopting Serial Transmission Scheme
  1-3: Functional Configuration of Mobile Terminal 130 according to New Scheme
    1-3-1: Encoding Method relating to Multilevel Code based on AMI Code
    1-3-2: Decoding Method relating to Multilevel Code based on AMI Code
  1-4: Amplitude Control Method for Multilevel Signal
    1-4-1: Issues caused due to Excessively Small/Large Amplitudes
    1-4-2: Issues caused due to Amplitude Characteristics of Multilevel Signal
2: Embodiment
  2-1: Separate Coding Scheme
    2-1-1: Encoding Method according to Separate Coding Scheme
    2-1-2: Amplitude Characteristics of Multilevel Signal according to Separate Coding Scheme
    2-1-3: Comparison between New Scheme and Separate Coding Scheme
  2-2: Configuration of Gain Control Feedback Means
3: Conclusion <1. Introduction>

First, before describing in detail the technology according to an embodiment of the present invention, issues to be solved by the present embodiment will be briefly summarized.

(1-1: Device Configuration of Mobile Terminal 100 Adopting Parallel Transmission Scheme)

First, a device configuration of a mobile terminal 100 adopting a parallel transmission scheme will be briefly described with reference to FIG. 1. FIG. 1 is an explanatory diagram showing an example of the device configuration of the mobile terminal 100 adopting a parallel transmission scheme. In FIG. 1, a mobile phone is schematically illustrated as an example of the mobile terminal 100. However, the application scope of the technology described below is not limited to a mobile phone. For example, it can be applied to an information processing apparatus such as a notebook PC or various portable electronic devices.

As shown in FIG. 1, the mobile terminal 100 mainly includes a display unit 102, a liquid crystal unit 104 (LCD), a connecting unit 106, an operation unit 108, a baseband processor 110 (BBP), and a parallel signal path 112. The LCD is an abbreviation for Liquid Crystal Display. Additionally, the display unit 102 and the operation unit 108 may be respectively referred to as a display side and a main body side. Additionally, for the sake of explanation, a case where an image signal is transmitted through the parallel signal path 112 will be described as an example. Of course, the type of a signal to be transmitted through the parallel signal path 112 is not limited to such, and it may also be a control signal, an audio signal, or the like, for example.

As shown in FIG. 1, the liquid crystal unit 104 is provided on the display unit 102. The image signal transmitted through the parallel signal path 112 is input to the liquid crystal unit 104. The liquid crystal unit 104 displays an image based on the input image signal. Also, the connecting unit 106 is a member connecting the display unit 102 and the operation unit 108. The connecting member forming the connecting unit 106 has a structure that enables the display unit 102 to rotate 180 degrees in a Z-Y plane, for example. The connecting member can also be formed such that the display unit 102 can rotate in an X-Z plane. In this case, the mobile terminal 100 will have a structure capable of folding. Additionally, the connecting member may also have a structure that allows the display unit 102 to move freely in any direction.

The baseband processor 110 is an arithmetic processing unit that provides the mobile terminal 100 with a communication control function and an application execution function. A parallel signal that is output from the baseband processor 110 is transmitted through the parallel signal path 112 to the liquid crystal unit 104 of the display unit 102. The parallel signal path 112 is provided with a plurality of signal lines. In the case of a mobile phone, for example, the number n of the signal lines is approximately fifty lines. The image signal transmission speed is approximately 130 Mbps in a case where the resolution of the liquid crystal unit 104 is QVGA. The parallel signal path 112 is wired such that the lines pass through the connecting unit 106.

In other words, the plurality of signal lines that form the parallel signal path 112 are provided in the connecting unit 106. As described above, if the range of movement of the connecting unit 106 is increased, the risk increases that the movement will inflict damage on the parallel signal path 112. This would result in impairment of the reliability of the parallel signal path 112. On the other hand, if the reliability of the parallel signal path 112 is maintained, the range of movement of the connecting unit 106 will be restricted. It is for this reason that the serial transmission scheme has come to be widely used in mobile phones and the like in order to maintain the reliability of the parallel signal path 112 while also increasing the degree of freedom of the movable member that forms the connecting unit 106. The shift to the serial transmission scheme for the transmission line is also being promoted from the standpoint of electromagnetic interference (EMI).

(1-2: Device Configuration of Mobile Terminal 130 Adopting Serial Transmission Scheme)

Figure 2:
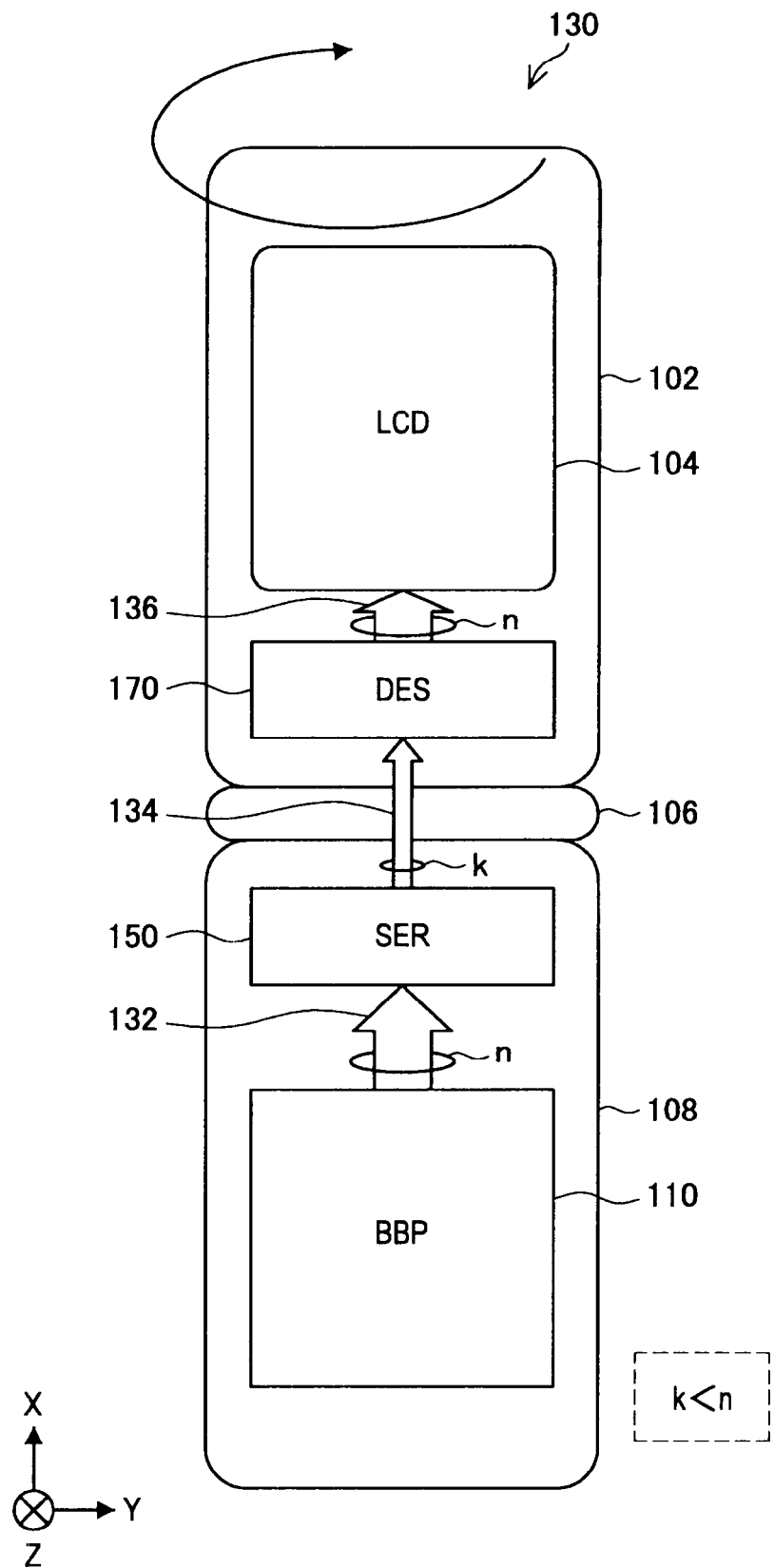
FIG. 2 is an explanatory diagram showing a configuration example of a mobile terminal adopting a serial transmission scheme.

Now, a device configuration of a mobile terminal 130 adopting the serial transmission scheme will be briefly described with reference to FIG. 2. FIG. 2 is an explanatory diagram showing an example of the device configuration of the mobile terminal 130 adopting the serial transmission scheme. In FIG. 2, a mobile phone is schematically illustrated as an example of the mobile terminal 130. However, the application scope of the technology described below is not limited to a mobile phone. For example, it can be applied to an information processing apparatus such as a notebook PC or various portable electronic devices. Furthermore, structural elements having functions substantially the same as those of the mobile terminal 100 of the parallel transmission scheme shown in FIG. 1 will be denoted with the same reference numerals, and detailed explanation of these structural elements will be omitted.

As shown in FIG. 2, the mobile terminal 130 mainly includes the display unit 102, the liquid crystal unit 104 (LCD), the connecting unit 106, and the operation unit 108. Also, the mobile terminal 130 includes the baseband processor 110 (BBP), parallel signal paths 132, 136, a serial signal path 134, a serializer 150, and a deserializer 170.

Unlike the mobile terminal 100 that is described above, the mobile terminal 130 transmits the image signal by the serial transmission scheme through the serial signal path 134 that is wired through the connecting unit 106. Therefore, the serializer 150 is provided in the operation unit 108 to serialize the parallel signal that is output from the baseband processor 110. On the other hand, the deserializer 170 is provided in the display unit 102 to parallelize the serial signal that is transmitted through the serial signal path 134.

The serializer 150 converts the parallel signal that is output from the baseband processor 110 and input through the parallel signal path 132 into a serial signal. The serial signal that has been converted by the serializer 150 is input to the deserializer 170 through the serial signal path 134. When the serial signal is input, the deserializer 170 restores the original parallel signal from the input serial signal. Then, the deserializer 170 inputs the parallel signal to the liquid crystal unit 104 through the parallel signal path 136.

In the serial signal path 134, NRZ data, for example, may be transmitted on its own, or alternatively, a data signal and a clock signal may be transmitted together. Furthermore, the number k of the lines in the serial signal path 134 is significantly less than the number n of the lines in the parallel signal path 112 in the mobile terminal 100 in FIG. 1 ($1 \leq k << n$). For example, the number k of the lines can be reduced to only a few lines. Therefore, the degree of freedom relating to the movable range of the connecting unit 106 through which the serial signal path 134 passes can be said to be very much greater than that of the connecting unit 106 through which the parallel signal path 112 passes. At the same time, it can also be said that the reliability of the serial signal path 134 is high. Additionally, a differential signal such as a LVDS or the like is ordinarily used for the serial signal that flows through the serial signal path 134. The LVDS is an abbreviation for Low Voltage Differential Signal.

Heretofore, the device configuration of the mobile terminal 130 has been briefly described. The overall device configuration of the mobile terminal 130 adopting the serial transmission scheme is approximately as described above. However, how much the number of signal lines in the connecting unit 106 can be reduced depends on the form of the signal flowing through the serial signal path 134. The serializer 150 and the deserializer 170 are to determine the form of this signal. In the following, functional configurations of the serializer 150 and the deserializer 170 according to the above-described new scheme will be described.

(1-3: Functional Configuration of Mobile Terminal 130 According to New Scheme)

Figure 3:
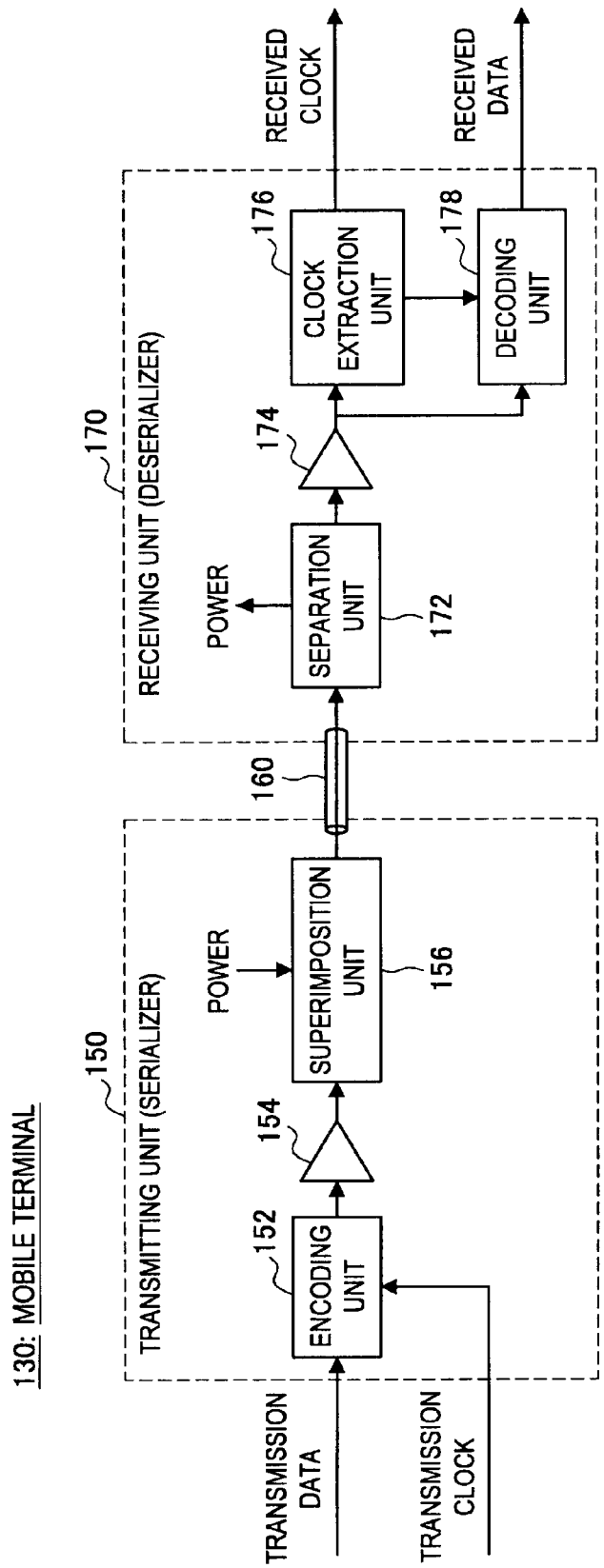
FIG. 3 is an explanatory diagram showing a functional configuration example of a mobile terminal according to a new scheme.

Here, the functional configuration of the mobile terminal 130 according to the new scheme will be described with reference to FIG. 3. FIG. 3 is a functional configuration example of the mobile terminal 130 according to the new scheme. The technical feature of the new scheme lies in an encoding method of data and a transmission method of encoded data. Accordingly, only the main functional configuration of the serializer 150 constituting a transmitting unit of the mobile terminal 130 and the main functional configuration of the deserializer 170 constituting a receiving unit of the mobile terminal 130 are shown in FIG. 3. Accordingly, it should be noted that description of other general configuration elements is omitted.

As shown in FIG. 3, the serializer 150 mainly includes an encoding unit 152, a driver 154, and a superimposition unit 156. Also, the deserializer 170 mainly includes a separation unit 172, a receiver 174, a clock extraction unit 176, and a decoding unit 178. The serializer 150 and the deserializer 170 are electrically connected via a coaxial cable 160. Additionally, the coaxial cable is an example of the serial signal path 134.

When transmission data and a transmission clock are transmitted from the baseband processor 110 to the serializer 150 through the parallel signal path 132, the transmission data and the transmission clock transmitted to the serializer 150 are input to the encoding unit 152. The encoding unit 152 generates a multilevel code from the transmission data by using the encoding method of the new scheme. The multilevel code here is a code that uses a plurality of amplitude levels to express one bit value. For example, a 6-level code that expresses a bit value 1 by four values, +3, +1, −1, and −3, and a bit value 0 by amplitude levels +2 and −2 is an example of the multilevel code mentioned above.

Furthermore, the multilevel code generated by the encoding unit 152 is configured such that the polarity (+/−) is inverted every half cycle of the transmission clock. Such multilevel code can be generated by synchronously adding the transmission clock to a bipolar code or a dicode code, such as an AMI code, a Manchester code, a partial response code, or the like. In reality, however, synchronous addition is rarely performed in a signal processing. In many cases, the multilevel code is directly generated from the transmission data by using a table or the like in which the amplitude level of a signal waveform obtained by synchronously adding the bipolar code and the transmission data and the bit value of the transmission data are associated with each other. Now, the multilevel code generated in this manner is converted into an appropriate amplitude level by the driver 154, and is input to the superimposition unit 156.

The multilevel code generated by the encoding unit 152 has a waveform whose polarity is inverted every half cycle of the transmission clock, and thus almost no DC component is included. Thus, even if the multilevel code is superimposed on a DC power and then transmitted, the multilevel code can be easily separated at the receiving side. Furthermore, by transmitting the multilevel code by superimposing the same on the DC power, the number of lines in the connecting unit 106 can be reduced to about one. For this reason, the superimposition unit 156 is provided in the serializer 150 illustrated in FIG. 3, and the DC power is superimposed on the multilevel code at the superimposition unit 156. The multilevel code on which the DC power is superimposed at the superimposition unit 156 (hereinafter, a superimposed signal) is input to the separation unit 172 through the coaxial cable 160.

The superimposed signal input to the separation unit 172 through the coaxial cable 160 is separated into the DC power and the multilevel code at the separation unit 172. Then, the multilevel code separated by the separation unit 172 is input to the clock extraction unit 176 and the decoding unit 178 via the receiver 174. First, a clock component is extracted from the input multilevel code at the clock extraction unit 176, and the transmission clock is regenerated. As has been described, the multilevel code according to the new scheme has a waveform whose polarity is inverted every half cycle of the transmission clock. Accordingly, by detecting the timing of the amplitude level of the multilevel code crossing zero, the transmission clock can be regenerated based on the detection result without using a PLL.

In this manner, the clock extraction unit 176 detects the timing of the amplitude level of the multilevel code crossing zero by using a comparator or the like whose threshold level is set to 0, and regenerates the transmission clock. Additionally, in the following description, the transmission clock regenerated at the clock extraction unit 176 will be referred to as a detected clock. The detected clock regenerated at the clock extraction unit 176 is output towards other structural elements of the display unit 102, and is also input to the decoding unit 178. When the multilevel code and the detected clock are input, the decoding unit 178 detects the timing of the amplitude level of the multilevel code exceeding a specific threshold level and the timing of the amplitude level falling below the specific level, and also, by using the detection result and the detected clock, detects each amplitude level of the multilevel code.

Furthermore, the decoding unit 178 decodes the transmission data based on the detected amplitude level of the multilevel code. The transmission data that has been decoded at the decoding unit 178 is output towards other structural elements of the display unit 102 as received data. As has been described, the mobile terminal 130 according to the new scheme transmits transmission data by using a multilevel code that uses a plurality of amplitude levels to express one bit value. As described above, the multilevel code has a waveform whose polarity is inverted every half cycle of a clock. Thus, the receiving side can extract a clock component from the multilevel code and regenerate a clock without using a PLL. As a result, a PLL does not have to be provided in the receiving side, and the circuit scale and the power consumption can be reduced to that extent.

(1-3-1: Encoding Method Relating to Multilevel Code Based on AMI Code)

Here, an encoding method for generating the multilevel code of the new scheme for which an AMI code serves as a base will be described with reference to FIGS. 4 and 5. The encoding method to be described here is realized by the function of the encoding unit 152 at the mobile terminal 130 described above. As described above, the multilevel code of the new scheme has a signal waveform that is obtained by synchronously adding a clock to a bipolar code. Here, an AMI code with a duty of 100% will be taken as an example of the bipolar code.

(Signal Waveform of AMI Code)

First, the waveform of the AMI code will be briefly described with reference to FIG. 4. FIG. 4 is an explanatory diagram showing an example of the signal waveform of the AMI code. Additionally, it is assumed that A is any positive number.

The AMI code is a code that uses an electrical potential of zero to express a bit value of zero and potentials of A and −A to express a bit value of 1. Note, however, that the potential A and the potential −A are used alternately. That is, after a bit value of 1 has been expressed by the potential A, if the next bit value is also a 1, that 1 will be expressed by the potential −A. FIG. 4 shows a signal waveform that is obtained by performing encoding based on an AMI coding rule in case bit values 0, 1, 0, 1, 1, 0, 0, 0, 0, 1, 1, 1, 0, 1 are input at timings T1, . . . , T14.

Figure 4:
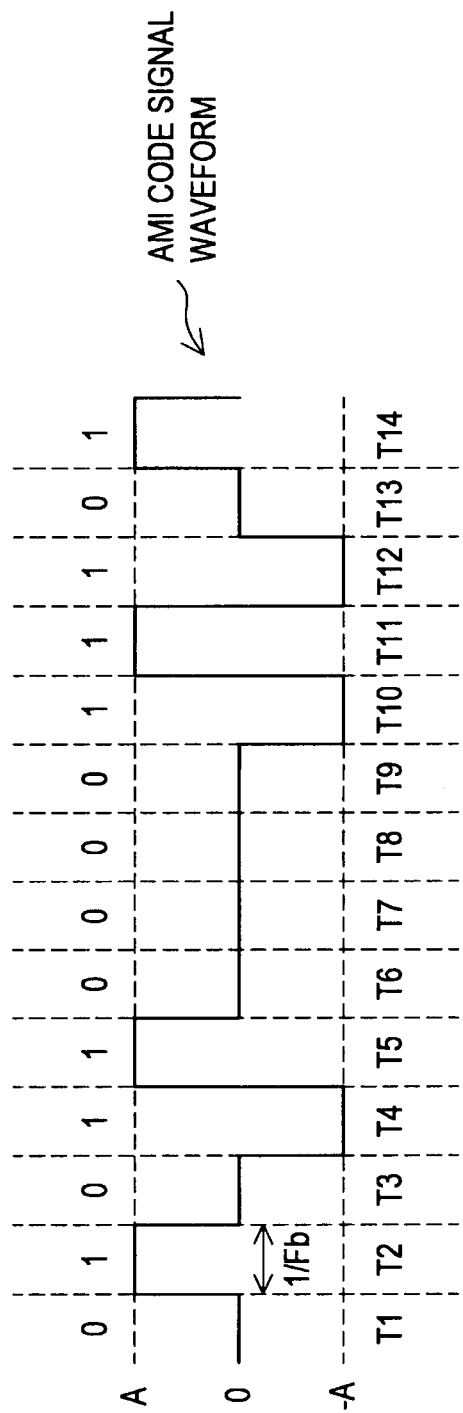
FIG. 4 is an explanatory diagram showing a signal waveform of an AMI code.

In the example of FIG. 4, a bit value 1 appears at timings T2, T4, T5, T10, T11, T12, and T14. If the amplitude level of the AMI code is at potential A at timing T2, the polarity will be inverted and the amplitude level at timing T4 will be at potential −A. Similarly, at timing T5, which is when the bit value 1 appears next, the amplitude level of the AMI code will be at potential A. As such, the AMI code has a polarity inversion characteristic according to which the amplitude level corresponding to a bit value 1 is alternately inverted between positive and negative. Additionally, the amplitude level of the AMI code corresponding to a bit value 0 is all expressed by a potential 0.

As described, the AMI code has the polarity inversion characteristic, and thus has a characteristic that it does not include a DC component. However, the potential 0 corresponding to the bit value 0 may appear consecutively. For example, the potential 0 occurs consecutively at timings T6, . . . , T9 in the example of FIG. 4. When such a period in which the potential 0 occurs consecutively exists, the amplitude level is not changed during the period, and it is difficult to extract a clock component from the received signal waveform of the AMI code without using a PLL. In view of such issue, a method has been devised which performs data transmission by using a multilevel code according to the new scheme described above.

(Encoding Method)

Here, referring to FIG. 5, a generation method of a multilevel code for which the AMI code serves as a base will be described in relation to the encoding method of the new scheme described above. FIG. 5 is an explanatory diagram showing a generation method of a multilevel code for which the AMI code serves as a base. Additionally, although a method of generating a multilevel code by synchronously adding a clock to the AMI code will be described here, the signal waveform of a multilevel code may also be directly generated from transmission data based on a coding rule which associates bit values 0 and 1 with each amplitude level of the multilevel code. In this case, the coding rule will be held by the encoding unit 152 in a table format or the like.

Figure 5:
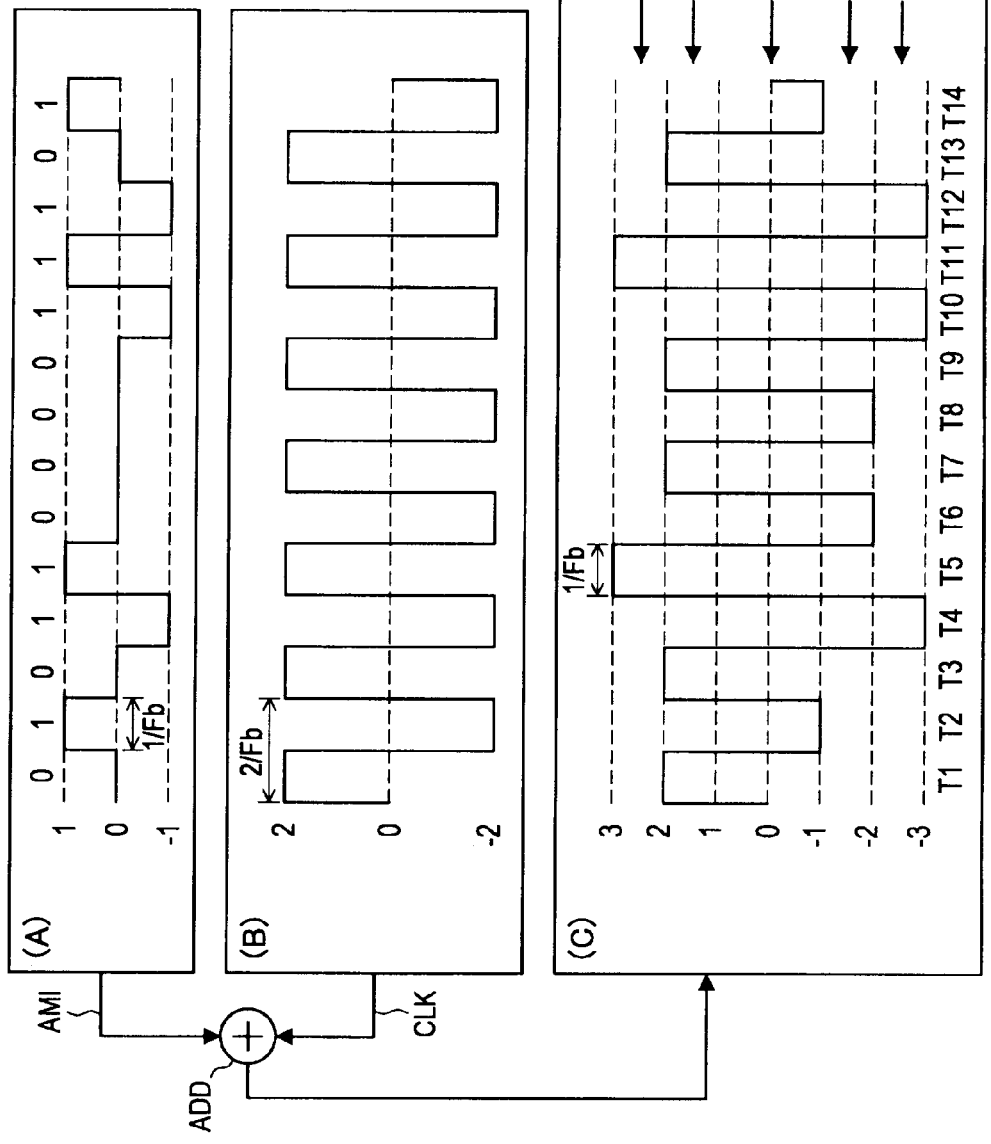
FIG. 5 is an explanatory diagram showing examples of a multilevel code generation method and an amplitude determination method of the new scheme for which the AMI code serves as a base.

In (C) of FIG. 5, the multilevel code which is generated by the encoding method of the new scheme and for which the AMI code serves as a base is shown. This multilevel code uses a plurality of potentials −1, −3, 1, and 3 to express a bit value 1, and uses a plurality of potentials −2 and 2 different from the above to express a bit value 0. Also, this multilevel code is configured in such a way that the polarity of the amplitude level is inverted every half cycle of a clock and does not take the same potential consecutively. For example, in the example of FIG. 5, there is a period between timings T6 and T9 where a bit value 0 occurs consecutively. However, the potentials take the values −2, 2, −2, and 2, and the same potential does not occur consecutively. By using such multilevel code, even if the same bit value appears consecutively, a clock component can be extracted by detecting the timing of the amplitude level crossing zero.

The signal waveform of the multilevel code of (C) of FIG. 5 is obtained by synchronously adding the AMI code shown in (A) of FIG. 5 and the clock shown in (B) of FIG. 5, for example. The signal waveform (A) of the AMI code shown in FIG. 5 is the same signal form as the AMI code shown in FIG. 4. Furthermore, when taking the transmission speed of the AMI code as Fb, the clock shown in (B) of FIG. 5 will have a frequency of Fb/2, which is half the Fb. Furthermore, the clock (B) has a larger amplitude range than the AMI code (A). In the example of FIG. 5, the amplitude range of the AMI code (A) is between −1 and +1, and, in contrast, the amplitude range of the clock (B) is set to between −2 and +2. More generally, the amplitude level of the clock (B) can be set to N times (N>1) that of the AMI code.

When the AMI code (A) and the clock (B) shown in FIG. 5 are synchronously added with their edges aligned, the multilevel code shown in (C) of FIG. 5 is generated. At this time, since the amplitude range of the clock (B) is set to be larger than the amplitude range of the AMI code (A), a multilevel code that expresses one bit value by a plurality of amplitude levels is generated. For example, when the amplitude level of the AMI code (A) is expressed as A1 and the amplitude level of the clock (B) is expressed as A2, the amplitude level A1+A2 of the multilevel code (C) will take six values: 1+2=3, 0+2=2, −1+2=1, 1−2=−1, 0−2=−2, and −1−2=−3. It should also be noted that the amplitude level of the multilevel code (C) has a polarity that is inverted every half cycle of the clock (B).

As described above, the multilevel code (C) according to the new scheme is obtained by synchronously adding the AMI code (A) and the clock (B). However, it is also possible to generate the multilevel code (C) directly from the transmission data by using a table or the like in which the bit values 0 and 1 and the amplitude levels of the multilevel code are directly associated with each other. When using such table or the like, a bit string 0, 1, 0, 1, 1, 0, . . . , 1 is directly converted into amplitude levels 2, −1, 2, −3, 3, −2, . . . , −1 of the multilevel code (C). Additionally, using either method, the bit value 0 of the transmission data will be expressed by the amplitude levels 2 and −2 of the multilevel code (C), and the bit value 1 will be expressed by the amplitude levels 3, 1, −1, and −3.

Heretofore, the encoding method of the new scheme for which the AMI code (A) serves as a base has been described.

Next, a method of decoding the original data from the multilevel code (C) will be described.

(1-3-2: Decoding Method Relating to Multilevel Code Based on AMI Code)

Here, the decoding method relating to the multilevel code (C) based on the AMI code will be described with reference to FIG. 5. Hereunder, a method of extracting a clock component from the multilevel code (C), a method of detecting each amplitude level from the multilevel code (C), and a method of decoding data from the detected amplitude level will be sequentially described. Additionally, the clock extraction process to be described here is realized by the function of the clock extraction unit 176. Also, the amplitude level detection process and the data extraction process are realized by the function of the decoding unit 178.

(Clock Extraction Method)

First, reference is made to FIG. 5. As has been described, with the multilevel code (C), the polarity of the amplitude level is inverted every half cycle of the clock. Accordingly, the clock extraction unit 176 can extract the clock component by detecting, using a comparator for which a threshold level TH1 (TH1=0) is set, the timing of the amplitude level of the multilevel code (C) crossing zero. For example, when comparing the multilevel code (C) with the threshold level TH1, a detected clock having a pulse that rises at a timing the amplitude level of the multilevel code (C) crosses the zero line upward and that falls at a timing the amplitude level crosses the zero line downward is obtained. The detected clock obtained in this way is input to the decoding unit 178.

(Amplitude Level Detection Method and Data Decoding Method)

As shown in FIG. 5, the multilevel code (C) according to the new scheme based on the AMI code has six amplitude levels: 3, 2, 1, −1, −2, and −3. Thus, there has to be at least four threshold levels to detect these amplitude levels.

For example, a threshold level TH3 (TH3=2.5) is set near the middle of the amplitude levels 3 and 2, and a threshold level TH2 (TH=1.5) is set near middle of the amplitude levels 2 and 1. Furthermore, a threshold level TH4 (TH4=−1.5) is set near the middle of the amplitude levels −1 and −2, and a threshold level TH5 (TH5=−2.5) is set near the middle of the amplitude levels −2 and −3. Also, comparators corresponding to respective threshold levels are provided, and the timing of the amplitude level of the multilevel code (C) crossing each threshold level is detected.

For example, when comparing the multilevel code (C) with the threshold level TH2, a data signal having a pulse that rises at a timing the amplitude level of the multilevel code (C) crosses the threshold level TH2 upward and that falls at a timing the amplitude level crosses the threshold level TH2 downward is obtained. Also, when comparing the multilevel code (C) with the threshold level TH3, a data signal having a pulse that rises at a timing the amplitude level of the multilevel code (C) crosses the threshold level TH3 upward and that falls at a timing the amplitude level crosses the threshold level TH3 downward is obtained.

Similarly, when comparing the multilevel code (C) with the threshold level TH4, a data signal having a pulse that rises at a timing the amplitude level of the multilevel code (C) crosses the threshold level TH4 upward and that falls at a timing the amplitude level crosses the threshold level TH4 downward is obtained. Also, when comparing the multilevel code (C) with the threshold level TH5, a data signal having a pulse that rises at a timing the amplitude level of the multilevel code (C) crosses the threshold level TH5 upward and that falls at a timing the amplitude level crosses the threshold level TH5 downward is obtained.

When data signals are obtained for respective threshold levels, the decoding unit 178 determines the amplitude level of the multilevel code (C) from the combination of these data signals. For example, when the amplitude level of a data signal corresponding to the threshold level TH3 is 1 at a certain timing, the amplitude level of the multilevel code (C) is determined to be 3. Also, when the amplitude level of a data signal corresponding to the threshold level TH3 is 0 and the amplitude level of a data signal corresponding to the threshold level TH2 is 1 at a certain timing, the amplitude level of the multilevel code (C) is determined to be 2. Furthermore, when the amplitude level of a data signal corresponding to the threshold level TH2 is 0 and the amplitude level of the detected clock is 1 at a certain timing, the amplitude level of the multilevel code (C) is determined to be 1.

Similarly, when the amplitude level of a data signal corresponding to the threshold level TH5 is 0 at a certain timing, the amplitude level of the multilevel code (C) is determined to be −3. Also, when the amplitude level of a data signal corresponding to the threshold level TH5 is 1 and the amplitude level of a data signal corresponding to the threshold level TH4 is 0 at a certain timing, the amplitude level of the multilevel code (C) is determined to be −2. Furthermore, when the amplitude level of a data signal corresponding to the threshold level TH4 is 1 and the amplitude level of the detected clock is 0 at a certain timing, the amplitude level of the multilevel code (C) is determined to be −1. The determination results of the amplitude levels obtained in this manner are converted into bit values at the decoding unit 178.

As has been described, the amplitude levels 3, 1, −1, and −3 of the multilevel code (C) correspond to the bit value 1, and the amplitude levels 2 and −2 correspond to the bit value 0. Thus, the decoding unit 178 converts the amplitude levels 3, 1, −1, and −3 into the bit value 1, and the amplitude levels 2 and −2 into the bit value 0. As a result, the transmission data is decoded from the multilevel code (C).

Heretofore, the encoding method and the decoding method according to the new scheme have been described. As described above, by transmitting data by using a multilevel code that is generated by using the encoding method and the decoding method of the new scheme, a PLL becomes unnecessary at the receiving side, and the power consumption can be reduced to that extent. Furthermore, by superimposing the multilevel code on a power line and transmitting the same, the number of lines in the connecting unit 106 can be greatly reduced. As a result, the degree of freedom of transformation of the mobile terminal 130 is increased, and also, the reliability of a signal line can be improved.

(1-4: Amplitude Control Method for Multilevel Signal)

As described above, the data transmission method according to the new scheme is a remarkable method. However, the following points should be kept in mind when using the method. The multilevel code (C) described above has a signal waveform obtained by synchronously adding the clock (B) to the AMI code (A). Thus, depending on the data pattern of data that is AMI-coded, the multilevel code (C) will have a waveform where a large amplitude value occurs consecutively within a certain period and a small amplitude value occurs consecutively within another period. Such waveform may indirectly cause erroneous determination at the time of determining each amplitude level of the multilevel code (C). In relation to this point, a detailed explanation will be given on the relationship between the waveform of the multilevel code (C) and the accuracy of the amplitude level determination. Additionally, the multilevel code (C) will be referred to as a multilevel signal in the following explanation.

(1-4-1: Issues Caused Due to Excessively Small/Large Amplitudes)

Figure 7:
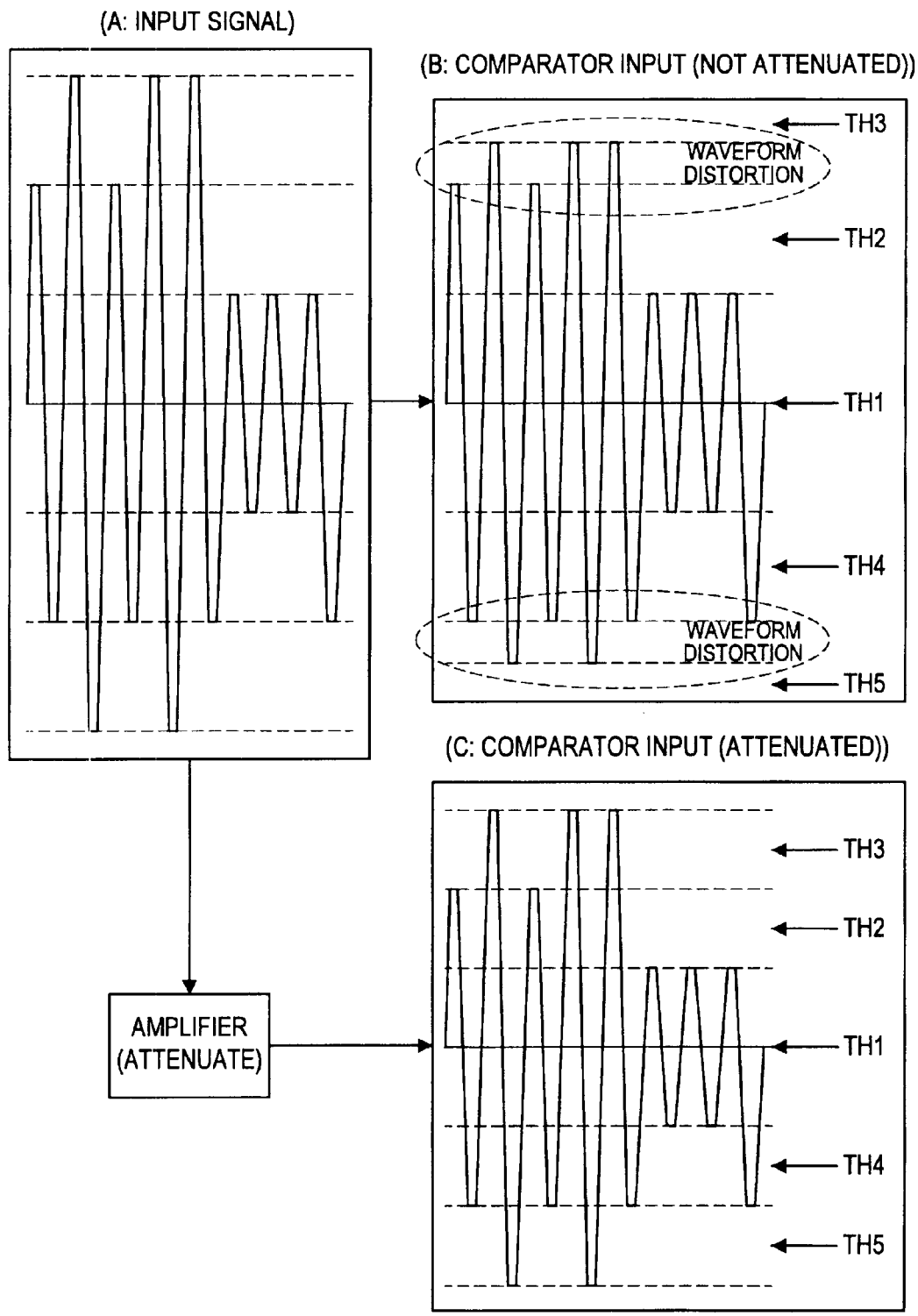
FIG. 7 is an explanatory diagram for explaining an issue arising in a case the amplitude of an input signal is excessively large at the receiving side and a solution to the issue.

First, referring to FIGS. 6 and 7, an issue arising at the time of detecting, at the receiving side, each amplitude level from the multilevel signal, and a solution to the issue will be described. FIG. 6 is an explanatory diagram showing an issue arising at the comparator that is provided to detect each amplitude level of the multilevel signal in a case the amplitude of the received multilevel signal (input signal) is excessively small, and a solution to the issue. On the other hand, FIG. 7 is an explanatory diagram showing an issue arising at the comparator that is provided to detect each amplitude level of the multilevel signal in a case the amplitude of the received multilevel signal (input signal) is excessively large, and a solution to the issue.

First, reference is made to FIG. 6. Each amplitude level of the multilevel signal is determined by the comparator provided at the receiving side. For example, in the case of the multilevel signal (multilevel code (C)) shown in FIG. 5, five threshold levels including the threshold level TH1 set for clock detection, i.e. TH1, TH2, TH3, TH4, and TH5, are used to determine respective amplitude levels. That is, comparators whose threshold levels are respectively set to TH1, TH2, TH3, TH4, and TH5 are provided at the receiving side, and each amplitude level is determined based on the comparator output. For example, the comparator whose threshold level is set to TH1 outputs a signal of level H in a period in which the amplitude level of the input signal exceeds the threshold level TH1, and outputs a signal of level L in a period in which the amplitude level falls below the threshold level.

Note that input hysteresis is set for each comparator to prevent chattering and malfunction. For example, in case of the comparator whose threshold level is set to TH1, the comparator output transitions to level H at a timing the amplitude level of the input signal crosses upward a threshold level TH1+ΔTH (ΔTH>0). Also, the comparator output transitions to level L at a timing the amplitude level of the input signal crosses downward a threshold level TH1−ΔTH (ΔTH>0). As shown in FIG. 6, comparators for which input hysteresis is set have dead zones above and below the amplitude level.

Thus, as shown in FIG. 6, in a case the amplitude of the multilevel signal input to the comparator is excessively small, if the threshold levels of the comparators are set to be low in accordance with the amplitude, the input multilevel signal may not exceed the hysteresis. Accordingly, it may become difficult for each comparator to perform accurate comparison for each amplitude level of the multilevel signal. Also, in a case an overdrive amount necessary for high speed operation is set, if the amplitude of the multilevel signal is excessively small, a necessary overdrive amount may not be ensured, and it may not be possible to perform accurate comparison for each amplitude level at the time of high speed operation.

Furthermore, the dynamic range of the received signal is decided based on the circuit configuration of the receiving side, power supply voltage, and the like, and will be fixed to a certain extent at the time of operation. Also, it is difficult to make the setting of the input hysteresis and the overdrive amount variable at the time of operation, and they are in many cases already set at the time of circuit design. For this reason, to enable accurate comparison of each amplitude level of the multilevel signal, a method has been devised, as shown in FIG. 6, of amplifying, by an amplifier, the multilevel signal (input signal A) whose amplitude is excessively small and then inputting the same to the comparator. In this manner, by amplifying the multilevel signal by an amplifier to an appropriate amplitude, it becomes possible to perform accurate comparison for each amplitude level even if input hysteresis is set for each comparator and even at the time of high speed operation.

Next, reference will be made to FIG. 7. Contrary to the case of FIG. 6, in a case where the amplitude of the input multilevel signal (input signal A) is excessively large, the amplifier provided before the comparators is saturated and thus the signal waveform is distorted. For example, as shown in FIG. 7, due to the saturation of the amplifier, high amplitude level of the multilevel signal is suppressed to such a degree that threshold determination is not possible at a part of the threshold levels (TH3, TH5, and the like), and accurate comparison for each amplitude level becomes difficult. Accordingly, a measure is taken to attenuate the amplitude of the input multilevel signal by the amplifier. As such, to compare each amplitude level of the multilevel signal, a configuration is preferable, which inputs the multilevel signal to the comparators after adjusting the multilevel signal to an appropriate amplitude by performing an amplification process or an attenuation process according to the amplitude of the multilevel signal.

For example, a configuration where a variable gain amplifier is arranged before the comparators and a mechanism for controlling the gain of the variable gain amplifier according to the amplitude of the input multilevel signal is provided is considered to be suitable from the standpoint of reducing transmission error.

Figure 8:
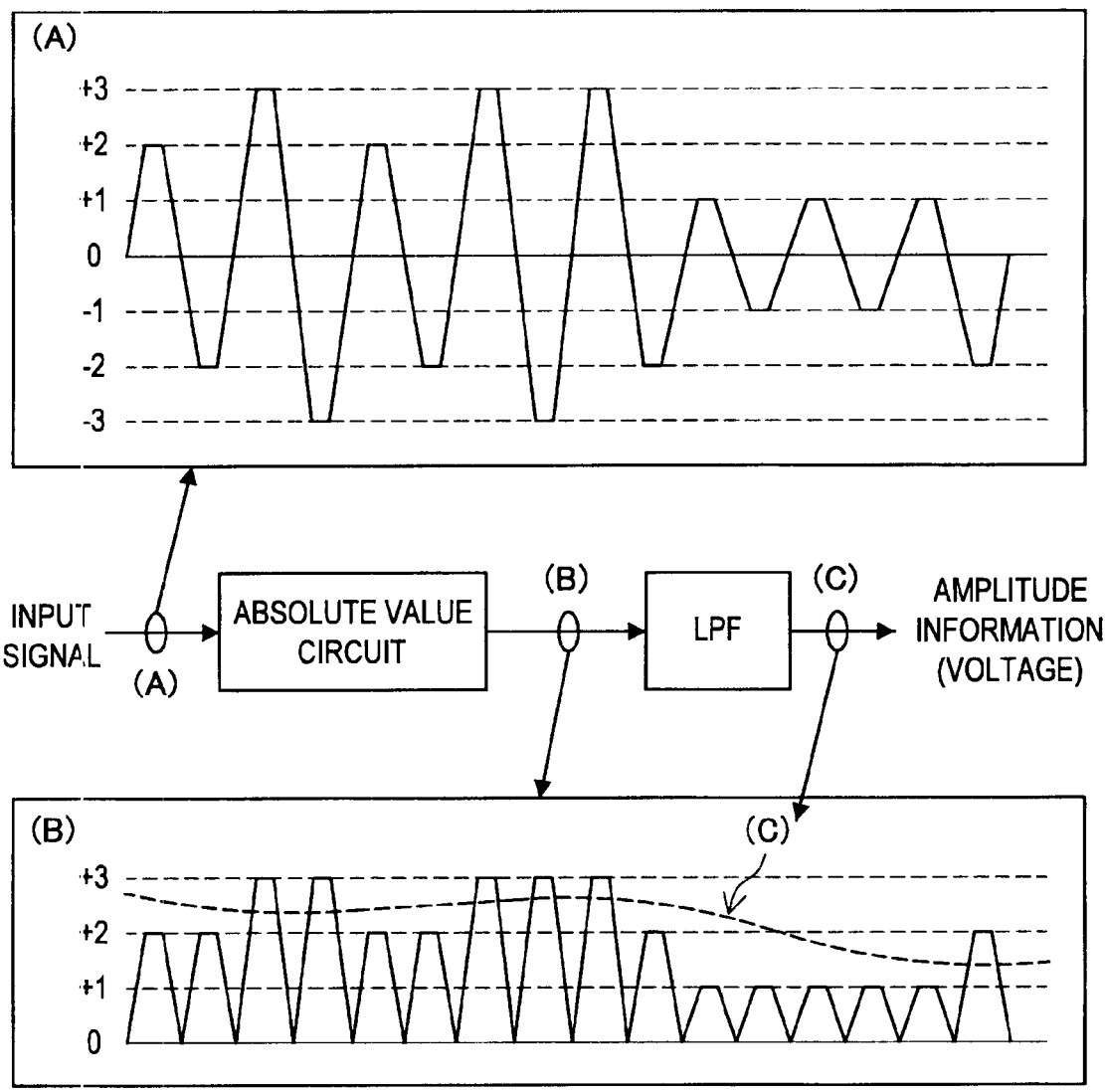
FIG. 8 is an explanatory diagram showing a configuration example of means for detecting average amplitude information (voltage) of an input signal.
Figure 9:
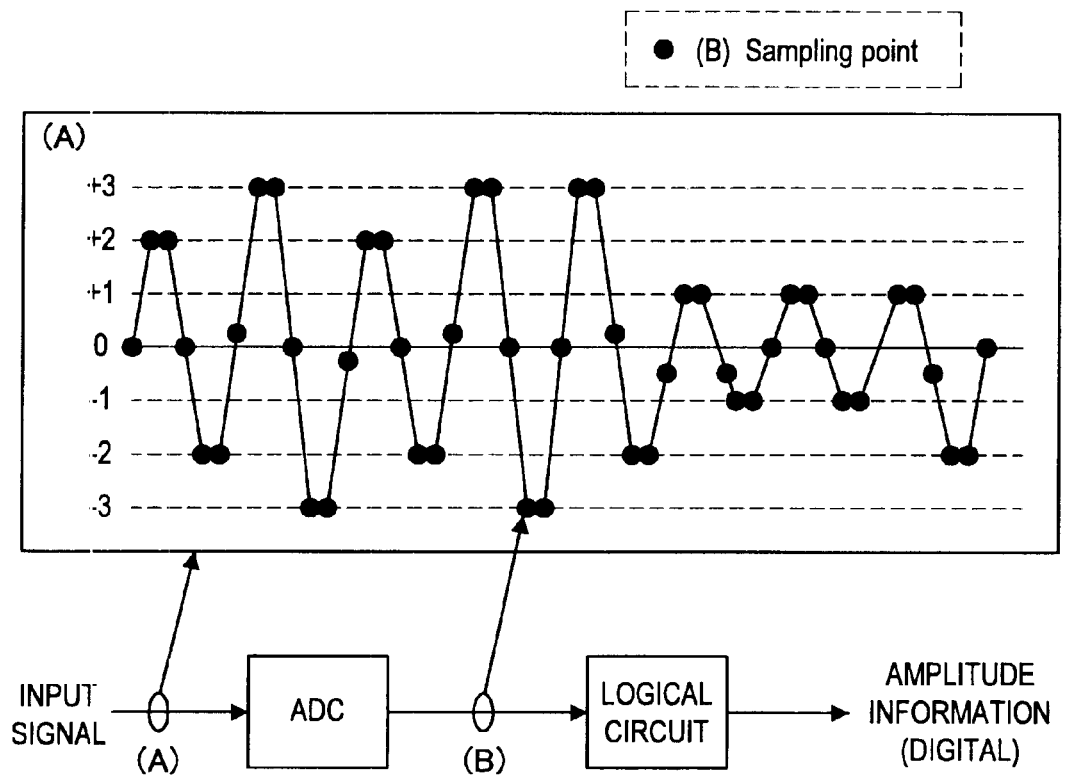
FIG. 9 is an explanatory diagram showing a configuration example of means for detecting amplitude information (digital value) of an input signal.

Next, a method of detecting amplitude information of a multilevel signal which will be a reference for performing gain control by the variable gain amplifier will be considered. As a method of detecting amplitude information of a multilevel signal, there can be assumed, for example, an analogue method of using, as the amplitude information, a time-averaged value obtained by averaging the absolute amplitude value of a multilevel signal over a specific period of time, as shown in FIG. 8. According to this method, first, a multilevel code (A) is input to an absolute value circuit, and an absolute value waveform (B) is obtained. Then, the absolute value waveform (B) is input to a low-pass filter (LPF) having a specific time constant, and a time-averaged waveform (C) is obtained. In the case of the method shown in FIG. 8, the time-averaged waveform (C) is output as the amplitude information, and is used for the gain control by the variable gain amplifier. Additionally, as a similar method, a method that uses a peak hold circuit and a bottom hold circuit can also be assumed.

Furthermore, as the method of detecting amplitude information to be used for the gain control, there can also be assumed a digital method of performing high speed digital sampling at a sufficient speed compared to the data rate and acquiring the amplitude information of the multilevel signal from the sampling result by using a logical circuit. According to this method, first, the multilevel signal (A) is input to an analog-to-digital converter (ADC) and is digitally sampled, and a sampling point (B) is obtained. Then, the sampling point (B) is input to the logical circuit, and the amplitude information of the multilevel signal is obtained. When using this digital method, the ADC that operates at a high speed and the logical circuit that operates at a high speed become necessary, and thus the power consumption will increase. Also, when the data rate is extremely high, it is difficult to realize such high-speed ADC and such high-speed logical circuit by the current circuit technology.

Based on the above considerations, the amplitude information of the multilevel signal to be used for the gain control by the variable gain amplifier is preferably detected by the analogue method as shown in FIG. 8. When using this method, the power consumption can be made relatively small, and cost can also be reduced.

Next, a concrete configuration of the receiving side having detection means for amplitude information shown in FIG. 8 built therein will be considered with reference to FIG. 10. FIG. 10 is an explanatory diagram showing the system configuration example of a receiving side including a gain control feedback loop that performs accurate comparison for each amplitude level by adjusting the amplitude of a multilevel signal that is input. Additionally, the system configuration example shown in FIG. 10 corresponds to the clock extraction unit 176 and the decoding unit 178 in the mobile terminal 130 shown in FIG. 3.

As shown in FIG. 10, the system configuration of the receiving side includes a variable gain amplifier 202 (VGA), comparators 204, 206, 208, 210, and 212, and a decoder 214. Furthermore, this system configuration includes an absolute value circuit 216, a low-pass filter 218 (LPF) and an operational amplifier 220 (OP), and forms the gain control feedback loop.

First, a multilevel signal is input to the absolute value circuit 216 via the variable gain amplifier 202. The amplitude value of the input signal is absolutised at the absolute value circuit 216. Then, the input signal whose amplitude value is absolutised at the absolute value circuit 216 is input to the low-pass filter 218. A specific time constant is set in the low-pass filter 218, and the time average of the input signal is calculated at the low-pass filter 218 with the time constant as the reference. That is, the time average (hereinafter, a time-averaged signal) of the absolute amplitude value of the multilevel signal is calculated by the absolute value circuit 216 and the low-pass filter 218.

The time-averaged signal output from the low-pass filter 218 is input to the operational amplifier 220. A reference level value is input, together with the time-averaged signal, to the operational amplifier 220. Then, the time-averaged signal and the reference level value are compared at the operational amplifier 220, and the comparison result is fed back to the variable gain amplifier 202. Gain control is performed at the variable gain amplifier 202 based on the comparison result by the operational amplifier 220 that has been fed back. As has been described with reference to FIGS. 6 and 7, to perform accurate comparison for respective amplitude levels of the multilevel signal at the comparators 204, 206, 208, 210 and 212, it is important that gain control is appropriately performed by the variable gain amplifier 202.

Furthermore, the time constant set in the low-pass filter 218 is also an important parameter. The gain control feedback loop (automatic gain control (AGC) loop) has low frequency cutoff characteristics. Thus, if the time constant of the low-pass filter 218 is too small, the low frequency component of a signal is suppressed and a waveform distortion is caused. On the other hand, if the time constant of the low-pass filter 218 is too large, it will take a long time until gain control is stably performed. For these reasons, it is desired that an appropriate time constant is set for the low-pass filter 218 in accordance with the application.

Now, when appropriate gain adjustment is completed at the variable gain amplifier 202, the multilevel signal amplified at the variable gain amplifier 202 is input to the comparators 204, 206, 208, 210, and 212. Threshold determination is performed at the comparators 204, 206, 208, 210, and 212 with threshold levels TH3, TH2, TH1, TH4, and TH5 serving as respective references. Then, the result of threshold determination by each of the comparators 204, 206, 208, 210, and 212 is input to the decoder 214. At this time, accurate threshold determination result is input to the decoder 214 provided that the amplitude of the multilevel signal was appropriately adjusted at the variable gain amplifier 202.

Data is decoded at the decoder 214 based on the threshold determination result input from each of the comparators 204, 206, 208, 210, and 212. At this time, a clock is regenerated based on the result of threshold determination for which the threshold level TH1 for clock detection has served as a reference (output of the comparator 208), and data is decoded by using the regenerated clock. Then, the clock regenerated at the decoder 214 (regenerated clock) and the data decoded at the decoder 214 (decoded data) are output towards other structural elements.

As described above, according to the system configuration of the receiving side shown in FIG. 10, gain control of the variable gain amplifier 202 is performed by the gain control feedback loop. Furthermore, the issues shown in FIGS. 6 and 7 are solved by the amplitude of the multilevel signal being adjusted by the variable gain amplifier 202 whose gain is controlled, and each amplitude level of the multilevel signal will be accurately compared. As a result, the decoding accuracy for data is improved. Note that, to obtain such effect, gain control of the variable gain amplifier 202 has to be appropriately performed. And to appropriately perform gain control of the variable gain amplifier 202, it is important that the time-averaged signal input to the operational amplifier 220 serves as accurate amplitude information.

(1-4-2: Issues Caused Due to Amplitude Characteristics of Multilevel Signal)

In many cases, the time-averaged value of a signal obtained by encoding certain data according to a specific coding scheme has a dependency on the data pattern. That is, if a time-averaged signal of a signal that is obtained by encoding data having a specific data pattern is generated, it might result in a characteristic that the time-averaged value becomes large in a certain period and small in another period. Here, referring to FIG. 11, consideration will be made with the case of the multilevel signal according to the new scheme as an example.

As described above, the multilevel signal according to the new scheme can be generated by generating an encoded signal by encoding data according to a specific coding scheme (for example, AMI coding scheme), and by synchronously adding a clock having a larger amplitude than the encoded signal. FIG. 11 illustrates a multilevel signal (C) that is obtained by generating an AMI code (B) by AMI-coding a data pattern (DATA=1, 1, 1, 1, 1, 1, 1, 0, 1, 1, 1, 1, 1, 1, 1) and synchronously adding a clock (A) to the AMI code (B). The multilevel signal (C) of FIG. 11 is divided, at the timing of data value 0, into a period in which the amplitude is large and a period in which the amplitude is small. It can be seen that, in the period in which the amplitude is large, the amplitude level of the multilevel signal (C) is stuck to +3 and −3 (amplitude range is 6). It can also be seen that, in the period in which the amplitude is small, the amplitude level of the multilevel signal (C) is stuck to +1 and −1 (amplitude range is 2).

The reason the amplitude level becomes stuck is as follows. In a period in which the amplitude range of the multilevel signal (C) is large, the clock (A) and the AMI code (B) that are synchronized with each other have the same polarity. For example, the AMI code (B) takes the value of +1 at a timing the clock (A) takes the value of +2, and the AMI code (B) takes the value of −1 at a timing the clock (A) takes the value of −2. On the contrary, in a period in which the amplitude range of the multilevel signal (C) is small, the clock (A) and the AMI code (B) that are synchronized with each other have different polarities. For example, the AMI code (B) takes the value of −1 at a timing the clock (A) takes the value of +2, and the AMI code (B) takes the value of +1 at a timing the clock (A) takes the value of −2. Although FIG. 11 shows an extreme case, even in a pattern where a data value 0 and a data value 1 are present in a mixed manner as shown in FIG. 12, a period of large amplitude and a period of small amplitude appear in such a way that they can be distinguished at a glance.

When such amplitude stuck period occurs, a time average of the absolute amplitude value in the period is calculated and the gain control of the variable gain amplifier 202 might be performed based on the calculation result. For example, if gain control is performed based on a time-averaged signal obtained in a period in which the amplitude is small, a gain that is larger than the appropriate gain that should actually be set is set in the variable gain amplifier 202. If the multilevel signal in a period in which the amplitude is large is amplified by such large gain, it may not be possible to perform accurate comparison for the amplitude level due to the same reason as the issue illustrated in FIG. 7.

On the other hand, if gain control is performed based on a time-averaged signal obtained in a period in which the amplitude is large, a gain that is smaller than the appropriate gain that should actually be set is set in the variable gain amplifier 202. If the multilevel signal in a period in which the amplitude is small is amplified by such small gain, it may not be possible to perform accurate comparison for the amplitude level due to the same reason as the issue illustrated in FIG. 6. Also, as has been described, if the time constant of the low-pass filter 218 is made excessively large, it will take extremely long time until the gain control feedback loop is stabilized. Accordingly, setting a time constant that is sufficiently longer than a pre-estimated amplitude stuck period to the low-pass filter 218 will not be a practical solution. Also, a data pattern that may occur is not known, and thus there is an issue that it is difficult to precisely pre-estimate the amplitude stuck period.

As a measure against such amplitude sticking, there can be assumed a measure of scrambling data to be transmitted at the transmitting side in advance. However, taking this measure inevitably increases the circuit scale. Also, in a case a data pattern that negates the scramble pattern occurs, the amplitude sticking will occur, and thus it will not be a fundamental solution. If the data pattern is known and if the change over time is slow for a signal, there can also be assumed a configuration of detecting amplitude information from a received signal and performing gain control of the variable gain amplifier 202 by using the detection result. Realistically, however, it is difficult to detect amplitude information from an unknown data pattern that changes with time at a high speed to use it for gain control.

Accordingly, the present inventors have developed a technology of suppressing the amplitude sticking of a multilevel signal that is generated from an unknown data pattern that changes with time at a high speed and of enabling appropriate gain control of the variable gain amplifier 202. Hereunder, an embodiment according to this technology will be described in detail.

<2. Embodiment>

Hereunder, an embodiment of the present invention will be described. The present embodiment relates to a technology of suppressing the amplitude sticking of a multilevel signal that is generated from an unknown data pattern that changes with time at a high speed. By adopting this technology, the receiving side is enabled to accurately perform gain control of the variable gain amplifier 202, the accuracy of comparison for each amplitude level based on the multilevel signal is improved, and the transmission quality can be improved. A detailed explanation will be given in the following.

(2-1: Separate Coding Scheme)

Here, a generation method of a multilevel signal according to the present embodiment and the amplitude characteristics of the multilevel signal will be described. Furthermore, a result of a simulation performed under a specific condition will be illustrated to compare the characteristics of the multilevel signal according to the present embodiment and the characteristics of the multilevel signal according to the above-described new scheme.

(2-1-1: Encoding Method According to Separate Coding Scheme)

Figure 13:
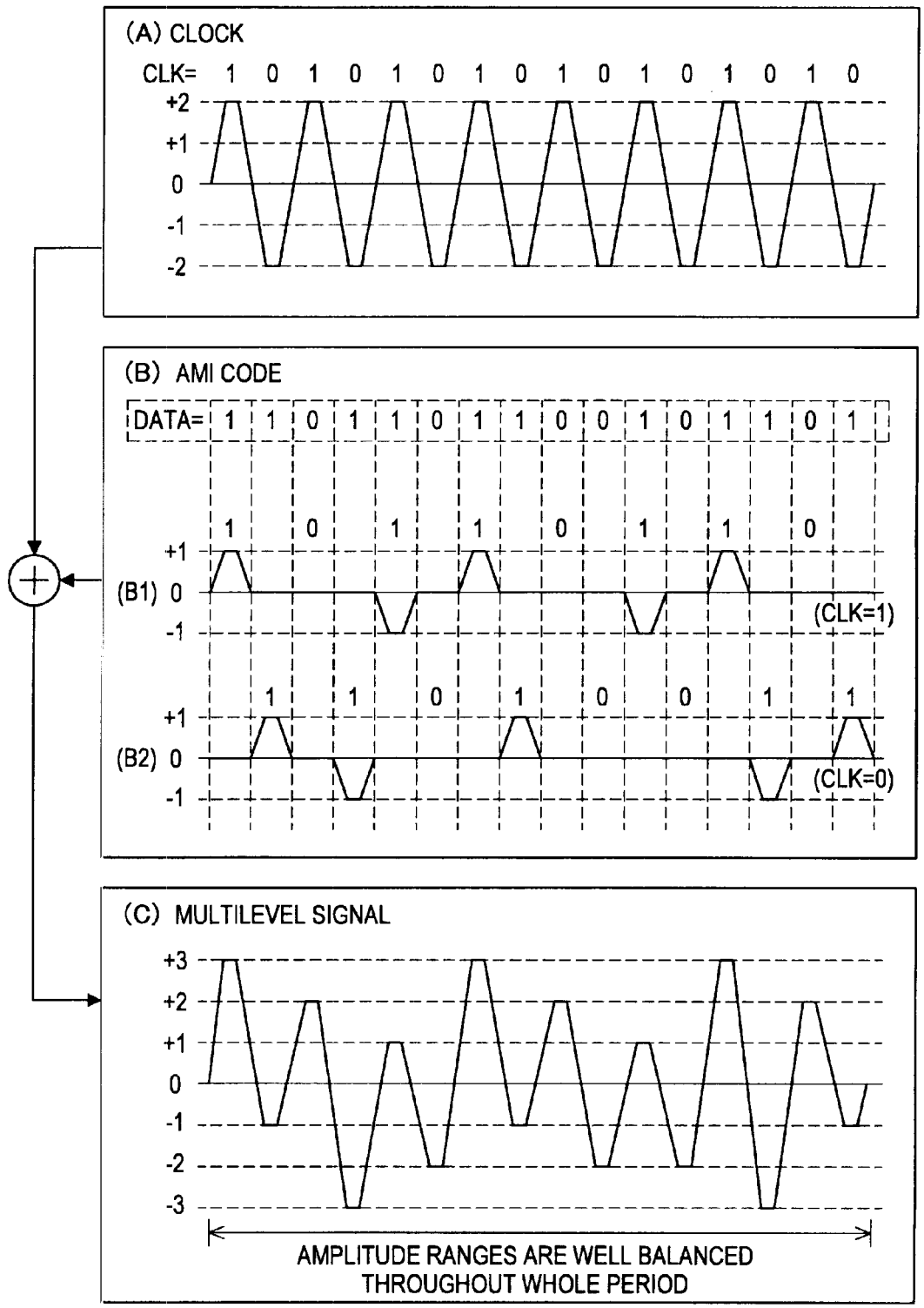
FIG. 13 is an explanatory diagram showing an example of an encoding method according to a separate coding scheme according to an embodiment of the present invention.

First, a generation method of the multilevel signal according to the present embodiment will be described with reference to FIG. 13. FIG. 13 is an explanatory diagram showing an example of the generation method of the multilevel signal according to the present embodiment. Additionally, for the sake of explanation, the description will be made, taking the AMI coding scheme as the coding scheme that serves as the base. However, the generation method can be applied not only to the AMI coding scheme, but also to various bipolar coding schemes and bi-phase coding schemes. For example, it can also be applied to a partial response coding scheme, a Manchester coding scheme, a CMI coding scheme, and the like.

As shown in FIG. 13, similarly to the new scheme described above, the encoding method according to the present embodiment generates an AMI code (B) by AMI-coding data, and also, generates a multilevel signal (C) by synchronously adding a clock (A) to the AMI code (B). Note that the encoding method according to the present embodiment is a method of separately AMI-coding, at the time of generating the AMI code (B), a bit string formed from bit values at odd-numbered positions (odd-number bit string) and a bit string formed from bit values at even-numbered positions (even-number bit string), among bit strings forming the data. That is, the amplitude level of the AMI code (B) to be synchronously added at a timing the amplitude level of the clock (A) is positive and the amplitude level of the AMI code (B) to be synchronously added at a timing the amplitude level of the clock (A) is negative are generated by independent encoding processes.

As such, the odd-number bit string and the even-number bit string are independently AMI-coded, and thus the coding scheme according to the present embodiment will be referred to as a separate coding scheme. In the example of FIG. 13, two AMI codes (B1) and (B2) are generated from a data pattern DATA=1, 1, 0, 1, 1, 0, 1, 1, 0, 0, 1, 0, 1, 1, 0, 1 based on the separate coding scheme. Among the data pattern DATA=1, 1, 0, 1, 1, 0, 1, 1, 0, 0, 1, 0, 1, 1, 0, 1, the bit string of positive amplitude levels of the clock (A) is DATA1=1, 0, 1, 1, 0, 1, 1, 0. On the other hand, among the data pattern DATA=1, 1, 0, 1, 1, 0, 1, 1, 0, 0, 1, 0, 1, 1, 0, 1, the bit string of negative amplitude levels of the clock (A) is DATA2=1, 1, 0, 1, 0, 0, 1, 1.

When encoding DATA1 mentioned above according to the AMI coding rule, the AMI code (B1) is generated. Also, when encoding DATA2 mentioned above according to the AMI coding rule, the AMI code (B2) is generated. Then, the AMI code (B1) is synchronously added to the clock (A) at a timing the amplitude level of the clock (A) is positive (CLK=1). Also, the AMI code (B2) is synchronously added to the clock (A) at a timing the amplitude level of the clock (A) is negative. With the clock (A) and the AMI codes (B) (AMI codes (B1) and (B2)) being synchronously added, the multilevel signal (C) as shown in FIG. 13 is generated. Looking at this multilevel signal (C), it can be seen that the amplitude ranges are well balanced without the amplitude being stuck to certain amplitude levels.

Furthermore, even when using the generation method of the multilevel signal according to the above-described separate coding scheme, a multilevel code that includes almost no DC component and that has amplitude characteristics that the polarity is inverted every half cycle of the clock, as with the multilevel signal according to the new scheme, is generated. Accordingly, even if the separate coding scheme according to the present embodiment is applied, the effect that is obtained by applying the data transmission method according to the new scheme will not be lost. Additionally, although expressions odd-number bit string/even-number bit string are used in this specification, these expressions are only for distinguishing between two combinations of bit values that are alternately extracted, and it should be noted that no special technical significance is attached to the meaning of odd number/even number.

(2-1-2: Amplitude Characteristics of Multilevel Signal According to Separate Coding Scheme)

Figure 14:
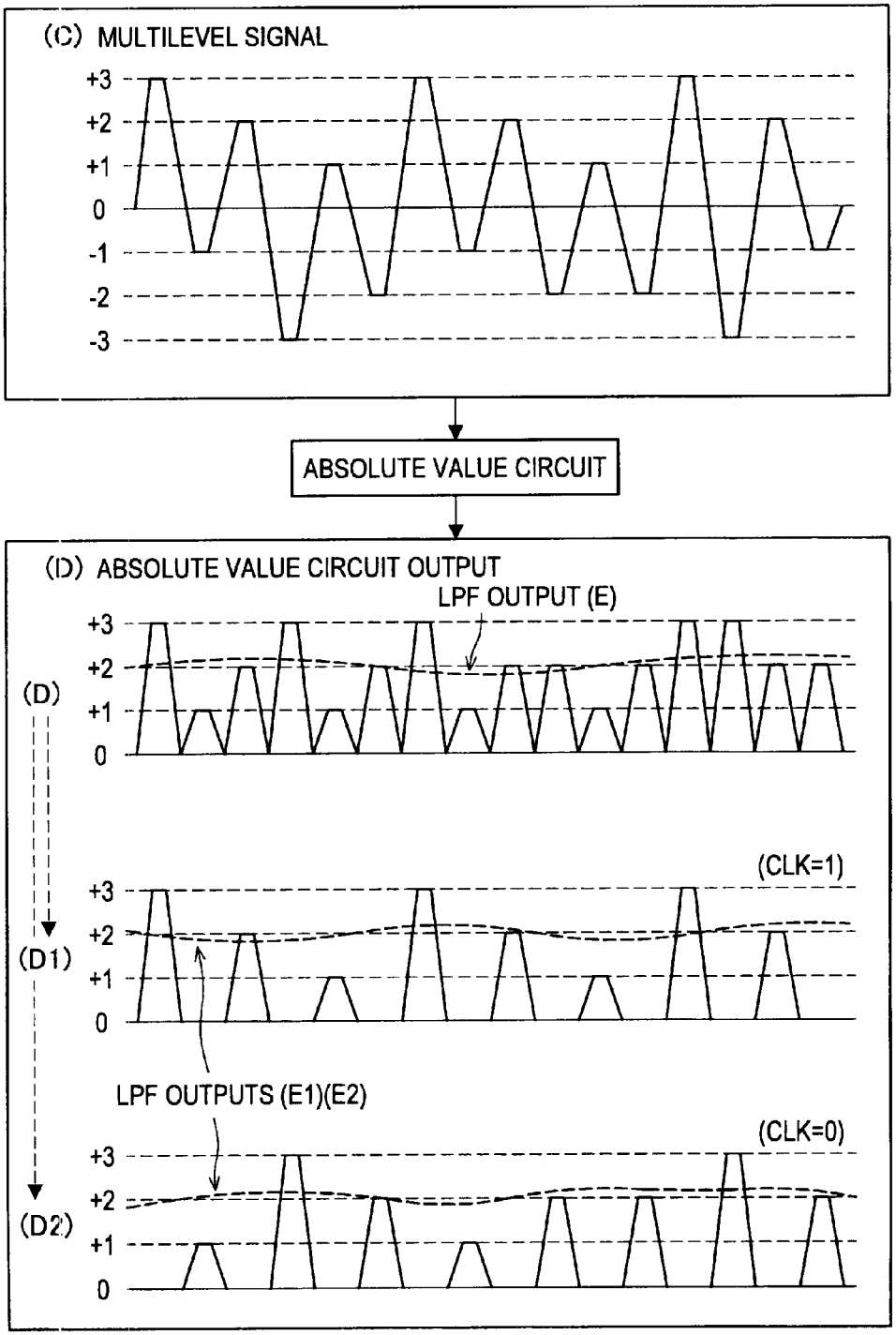
FIG. 14 is an explanatory diagram showing amplitude characteristics of a multilevel signal according to the separate coding scheme of the present embodiment.

Here, the amplitude characteristics of the multilevel signal generated by the above-described separate coding scheme will be described in greater detail with reference to FIG. 14. FIG. 14 is an explanatory diagram for describing the amplitude characteristics of the multilevel signal generated by the above-described separate coding scheme. Additionally, the reason why the amplitude sticking is suppressed in the multilevel signal generated by the above-described separate coding scheme will also be described in detail.

FIG. 14 shows the multilevel signal (C) that has been generated by the separate coding scheme shown in FIG. 13 and signal waveforms (D) and (E) that are obtained by passing the multilevel signal (C) through the absolute value circuit 216 and the low-pass filter 218. When the multilevel signal (C) is input to the absolute value circuit 216, a signal (D) is output from the absolute value circuit 216. When this signal (D) is input to the low-pass filter 218 with an appropriate time constant, a signal (E) is output from the low-pass filter 218. It can be seen that the signal (E) maintains the amplitude level at around +2 throughout the period and that the amplitude of the multilevel signal (C) is not fixed to a large amplitude value or a small amplitude value in any specific period.

Furthermore, FIG. 14 separately shows a signal (D1) that is obtained by detecting the signal (D) at a timing CLK=1 and a signal (D2) that is obtained by detecting the signal (D) at a timing CLK=0. Furthermore, signals (E1) and (E2) that are obtained by inputting the respective signals D1 and D2 to the low-pass filter 218 are also shown. As can be seen from FIG. 14, as with the signal (E), the signals (E1) and (E2) also maintain the amplitude levels at around +2 throughout the period.

The reason such amplitude characteristics are obtained is as follows. First, in the case of the separate coding scheme, the AMI codes (B1) and (B2) are AMI-coded independently. Also, only the amplitude level +2 of the clock (A) is added to the AMI code (B1), and only the amplitude level −2 of the clock (A) is added to the AMI code (B2). That is, a signal that is obtained by absolutising a signal obtained by adding a constant amplitude level +2 to the AMI code (B1) is the signal (D1) described above. Similarly, a signal that is obtained by absolute valuing a signal obtained by adding a constant amplitude level −2 to the AMI code (B2) is the signal (D2) described above.

To begin with, each of the AMI codes (B1) and (B2) includes almost no DC component. Thus, addition of a constant value to the AMI codes (B1) and (B2) only results in the centres of the amplitudes shifting to constant values from the zero level. Accordingly, when the signals (D1) and (D2) are input to the low-pass filter 218, outputs such as the signals (D1) and (D2) shown in FIG. 14 are obtained. As a matter of course, even if the signal (D), which is a combination of the signals (D1) and (D2), is input to the low-pass filter 218, no amplitude sticking is caused, and an output such as the signal (E) is obtained.

As described above, when using the separate coding scheme according to the present embodiment, the amplitude of the time-averaged signal obtained from a multilevel signal becomes independent of the data pattern, and gain control of the variable gain amplifier 202 can be stably performed at the receiving side. Also, in the case of the separate coding scheme according to the present embodiment, an odd-number bit string and an even-number bit string have to be independently AMI-coded, but no special circuit for prevention of amplitude sticking has to be newly added to the transmitting side and the receiving side. Accordingly, there is a merit that stable data transmission can be realized while not greatly increasing the manufacturing cost and the power consumption.

(2-1-3: Comparison Between New Scheme and Separate Coding Scheme)

A simulation was performed under specific conditions to check the effect that can be obtained by applying the separate coding scheme according to the present embodiment. The conditions for performing the simulation are as follows. (1) The AMI coding scheme was adopted as the coding scheme to serve as a base. (2) The multilevel signal of the new scheme was obtained by synchronously adding an AMI code with an amplitude range of 2 and a clock with an amplitude range of 4 as shown in FIG. 5. (3) The multilevel signal of the separate coding scheme was obtained by synchronously adding a clock having an amplitude range of 4 with AMI codes having amplitude range of 2 that were obtained by independently encoding two bit strings that had been separated into odd and even bits, as shown in FIG. 13.

Algorithms used in the simulation are as follows. (STEP 1) Generation of clock (CLK): generate a bit string 010101 . . . of 10000 bits. (STEP 2) Generation of data (DATA): generate a bit string of 10000 bits using a random number. Here, the ratio between 0 and 1 was made 1:1. (STEP 3) The bit string generated in STEP 2 was AMI-coded based on each of the new scheme and the separate coding scheme.

The details of STEP 3 are as follows. In the case of the new scheme: when DATA=0, the AMI code takes a value 0, and when DATA=1, the AMI code alternately takes values −1 and +1. In the case of the separate coding scheme: (even-number bit string) when DATA=0 in a period of CLK=0, the AMI code value 0 takes a value 0, and when DATA=1 in a period of CLK=0, the AMI code value 0 alternately takes values −1 and +1; (odd-number bit string) when DATA=0 in a period of CLK=1, the AMI code value 1 takes a value 0, and when DATA=1 in a period of CLK=1, the AMI code value 1 alternately takes values −1 and +1.

(STEP 4) The AMI codes generated based on the new scheme and the separate coding scheme are synchronously added to a clock, and the amplitude level of the multilevel signal is calculated. The calculation method is as follows. In the case of the new scheme: the amplitude level of the multilevel signal (OUT1)=4*(CLK−0.5)+AMI code value. In the case of separate coding scheme: the amplitude level of the multilevel signal (OUT2)=4*(CLK−0.5)+AMI code value 0, in a period of CLK=0; and the amplitude level of the multilevel signal (OUT2)=4*(CLK−0.5)+AMI code value 1, in a period of CLK=1.

(STEP 5) The multilevel signal (OUT1) of the new scheme and the multilevel signal (OUT2) of the separate coding scheme are absolutised, and an absolute value circuit output (ABS1) according to the new scheme and an absolute value circuit output (ABS2) according to the separate coding scheme are respectively obtained. (STEP 6) The absolute value circuit output (ABS1) according to the new scheme and the absolute value circuit output (ABS2) according to the separate coding scheme are passed through a LPF, and a LPF output (LPF1) according to the new scheme and a LPF output (LPF2) according to the separate coding scheme are respectively obtained.

The results of the simulation performed by the above-described method are shown in FIGS. 15, 16 and 17. Additionally, these results pick out and show a period from the 100th bit to the 200th bit. FIG. 15 shows the multilevel signal (A: OUT1) generated by the encoding method of the new scheme and the multilevel signal (B: OUT2) generated by the separate coding scheme. Also, FIG. 16 shows the absolute value circuit output (A: ABS1) of the multilevel signal (A: OUT1) according to the new scheme shown in FIG. 15 and the absolute value circuit output (B: ABS2) of the multilevel signal (B: OUT2) according to the separate coding scheme.

Furthermore, FIG. 17 shows the LPF output (A: LPF1) of the absolute value circuit output (A: ABS1) according to the new scheme shown in FIG. 16 and the LPF output (B: LPF2) of the absolute value circuit output (B: ABS2) according to the separate coding scheme. Additionally, the LPF outputs shown in FIG. 17 are obtained by passing the absolute value circuit outputs of FIG. 16 through a primary LPF with a time constant corresponding to a 4-symbol period. Furthermore, in FIG. 17, a standard deviation of each LPF output waveform over a period of 10000 symbols is described in addition. Referring to the simulation results of FIG. 17, it can be seen that the variability in the LPF output (B) according to the separate coding scheme is smaller compared to that of the LPF output (A) according to the new scheme.

This can also be confirmed by comparing the values of the standard deviation. In the case of the result of the simulation performed at this time, the standard deviation of the LPF output according to the separate coding scheme is about 47% of the standard deviation of the LPF output according to the new scheme. This result confirms that the time average of the amplitude of the multilevel signal according to the separate coding scheme is extremely stable. As such, when applying the separate coding scheme according to the present embodiment, dependency of the time average of the amplitude of the multilevel signal on a data pattern can be reduced, and stable gain control can be realized at the receiving side.

As a result, the time constant of the LPF provided in means for detecting amplitude information can be designed to be small, and thus the rise time can be shortened and also the error rate at the time of decoding can be reduced. Also, sticking of the signal amplitude to the upper or lower level in a specific data pattern will not occur, thereby making a scrambler or the like unnecessary at the transmitting side and allowing the circuit to be simplified. Moreover, the simplification will enable to reduce power consumption.

(2-2: Configuration of Gain Control Feedback Means)

Next, referring to FIGS. 18 to 21, an explanation will be given on system configurations and concrete circuit configurations of the transmitting side and the receiving side that are capable of realizing an encoding method and a decoding method according to the separate coding scheme of the present embodiment. Additionally, the module of the transmitting side and the module of the receiving side are connected by one transmission line or a pair of differential transmission lines, and a clock and a data signal are transmitted together. Furthermore, the system configuration shown in FIG. 18 extracts and describes main structural elements relating to the separate coding scheme of the present embodiment, and is used in combination with the structural elements of the mobile terminal 130 shown in FIG. 3, for example.

Figure 18:
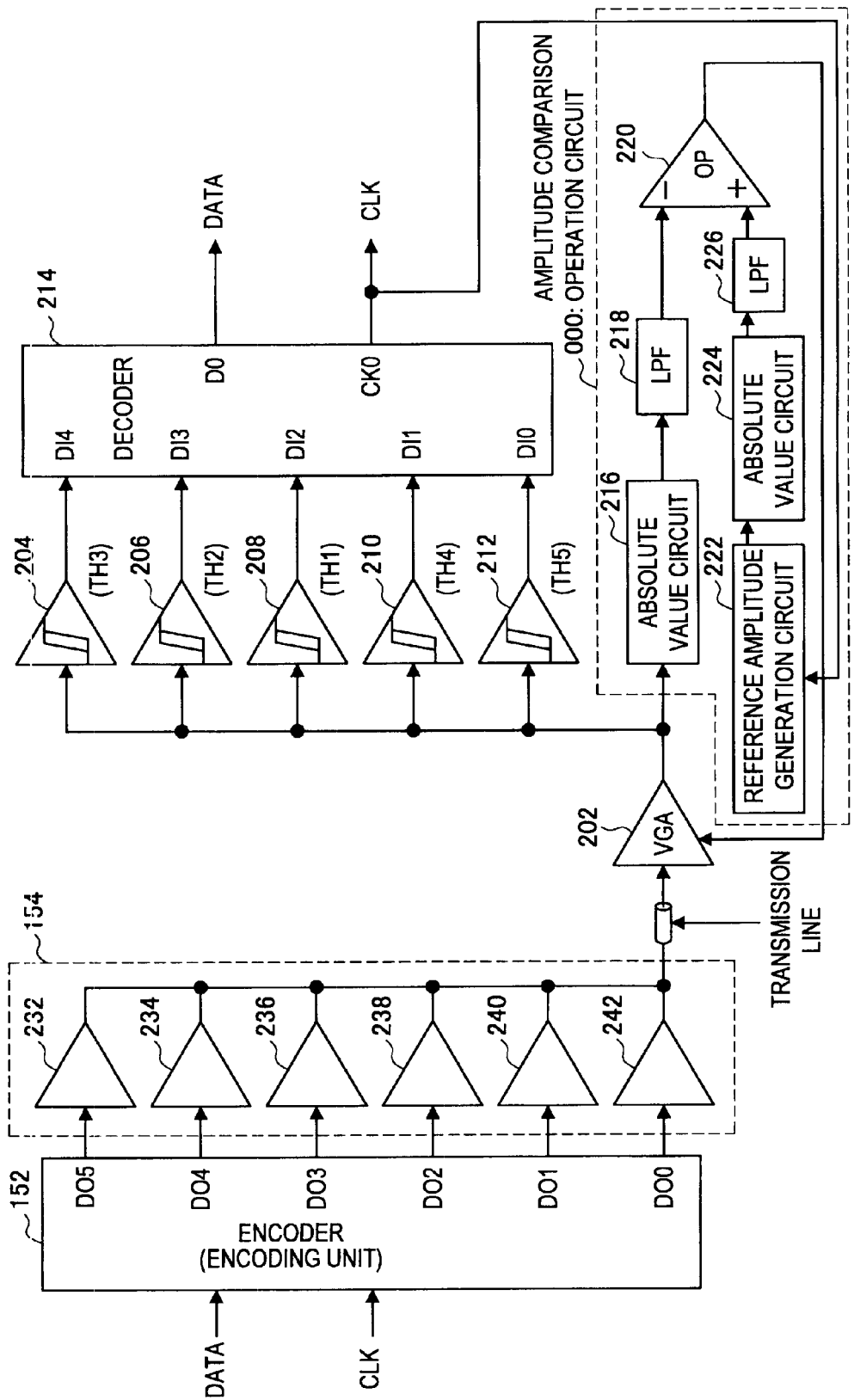
FIG. 18 is an explanatory diagram showing configuration examples of generation means for the multilevel signal according to the present embodiment and detection means for detecting each amplitude value and a clock component of the multilevel signal.
Figure 19:
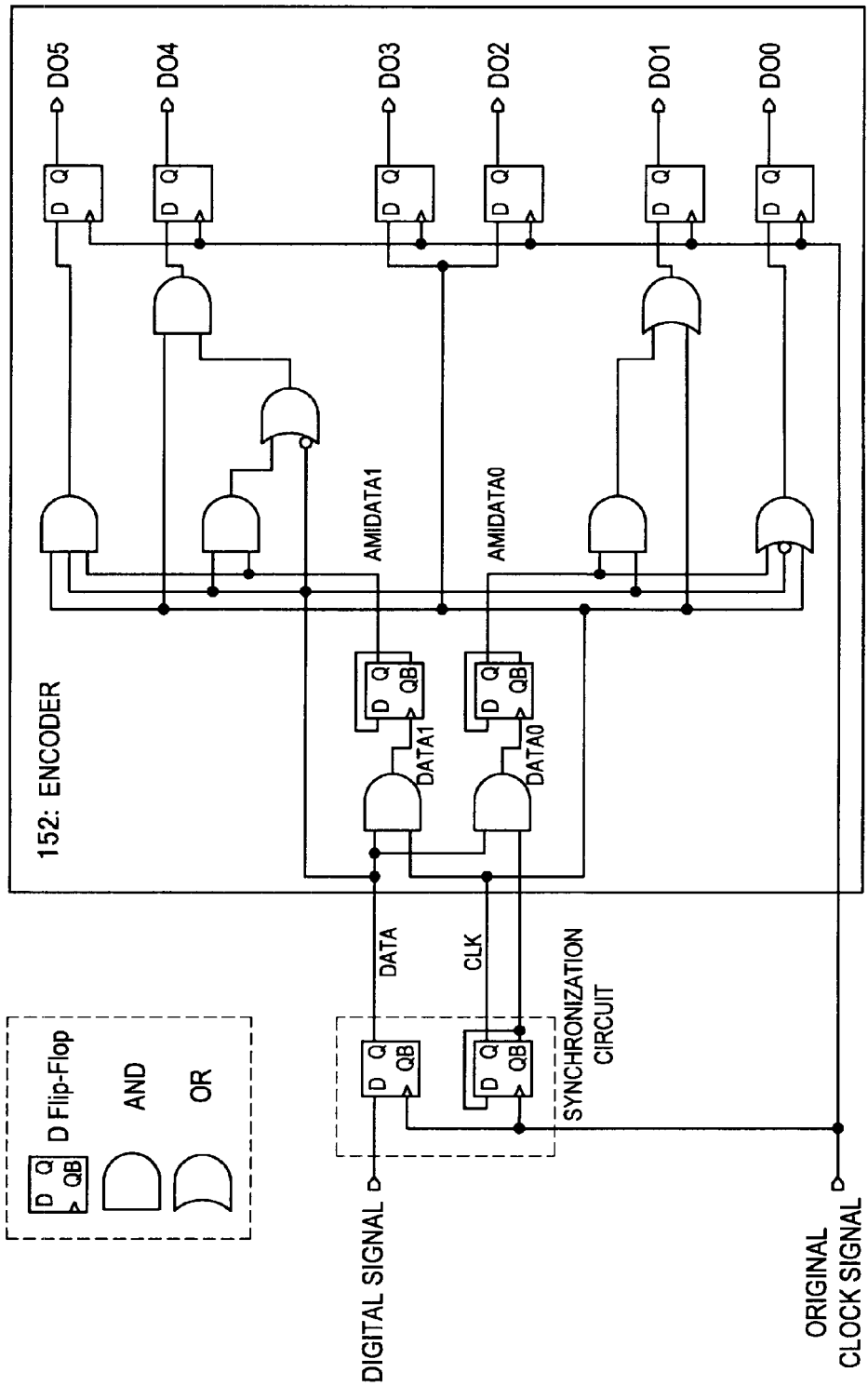
FIG. 19 is an explanatory diagram showing a configuration example of an encoder according to the present embodiment.

First, reference will be made to FIG. 18. The module of the transmitting side is configured mainly from an encoder (encoding unit 152) and the driver 154 (buffers 232, 234, 236, 238, 240, 242). First, a clock CLK to be transmitted and data DATA synchronized with the clock CLK are input to the encoder (encoding unit 152). This clock CLK is generated from an original clock CKI having a frequency twice flat of the clock CLK, by using the synchronization circuit shown in FIG. 19. The data DATA input to the encoder (encoding unit 152) is encoded by using the clock CLK. At this time, the encoder (encoding unit 152) encodes the data DATA based on the separate coding scheme described above and generates a multilevel signal.

The multilevel signal generated by the encoder (encoding unit 152) is output to a transmission line by the driver 154. The driver 154 outputs the amplitude level of the multilevel signal according to the number of bits having a bit value 1 among output; DO0 to DO5 of the encoder (encoding unit 152). The multilevel signal that reached the module of the receiving side through the transmission line is input to the variable gain amplifier 202 (VGA). The output of the variable gain amplifier 202 is input to the absolute value circuit 216 and is absolutised. Furthermore, the output of the absolute value circuit 216 is input to the low-pass filter 218, and the high frequency component is removed and a time average is output. The output of the low-pass filter 218 is input to the operational amplifier 220.

A reference voltage VREF is further input to the operational amplifier 220, and the output (amplitude information) of the low-pass filter 218 and the reference voltage VREF are compared. Additionally, a generation method of the reference voltage VREF will be described later. When the output of the low-pass filter 218 is lower than a desired level (reference voltage VREF), the operational amplifier 220 increases the gain of the variable gain amplifier 202. On the other hand, when the output of the low-pass filter 218 is higher than a desired level (reference voltage VREF), the operational amplifier 220 decreases the gain of the variable gain amplifier 202. By providing such gain control feedback loop, the output amplitude of the variable gain amplifier 202 is adjusted to be in a range that allows the comparators 204, 206, 208, 210, and 212 arranged after the variable gain amplifier 202 to perform accurate comparison for each amplitude level.

The output amplitude of the variable gain amplifier 202 is input to the comparators 204, 206, 208, 210, and 212. Threshold determination is performed at the comparators 204, 206, 208, 210, and 212 with the respectively set threshold levels as the reference, and the determination results (DI0, DI1, DI2, DI3, DI4) are input to the decoder 214. The decoder 214 is realized by a circuit configuration as shown in FIG. 21. When the determination results (DI0, DI1, DI2, DI3, DI4) are input to the decoder 214, data D0 and a clock component CK0 of the multilevel signal are generated based on the input values, and are respectively output as decoded data DATA and a regenerated clock CLK. Additionally, as is apparent from FIG. 13, the relationship between each amplitude level of the multilevel signal and each bit value is the same as in the case of the new scheme. For example, the amplitude levels +3, +1, −1, and −3 of the multilevel signal correspond to a bit value 1, and the amplitude levels +2 and −2 correspond to a bit value 0.

Figure 20:
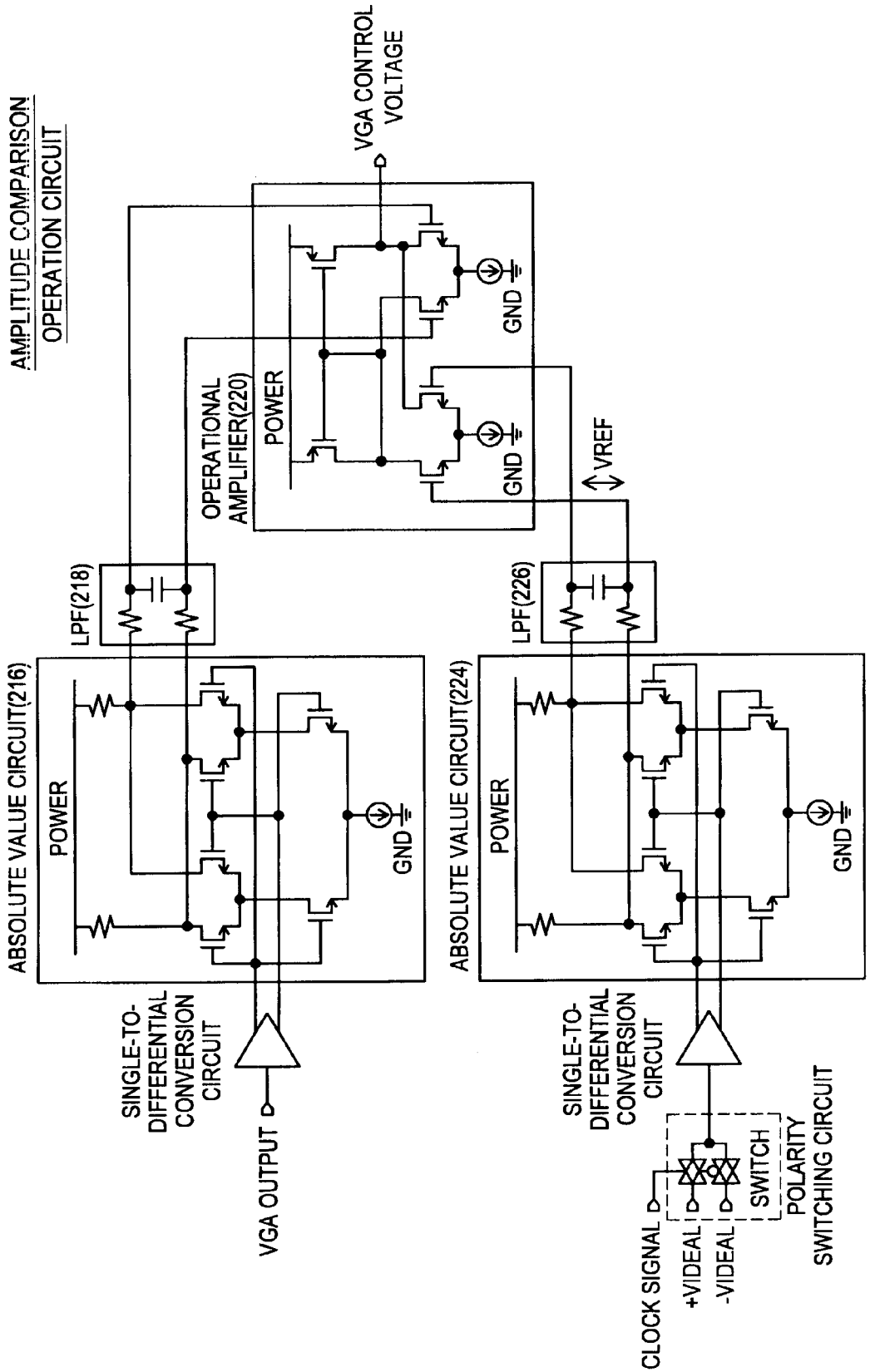
FIG. 20 is an explanatory diagram showing a configuration example of an amplitude comparison operation circuit according to the present embodiment.

Here, a concrete configuration example of an amplitude comparison operation circuit will be described with reference to FIG. 20. The amplitude comparison operation circuit can be divided largely into two parts: an amplitude detection circuit portion and a comparison circuit portion. The amplitude detection circuit is a portion that includes the absolute value circuit 216 and the low-pass filter 218. The comparison circuit is a portion that is mainly the operational amplifier 220. As shown in FIG. 20, the amplitude detection circuit is configured from a single-to-differential conversion circuit, a Gilbert cell mixer, and an RC-LPF. Furthermore, the reference voltage VREF to be input to the operational amplifier 220 is generated in the manner described below.

As has been described, a plurality of threshold levels of the comparator are provided according to the multiplicity of a multilevel signal. To perform accurate comparison for each amplitude level of the multilevel signal, proportional relationship between the amplitude level and a value (VIDEAL) that the time-averaged value of the output amplitude of the variable gain amplifier 202 is supposed to be are to be considered. The reference voltage VREF is obtained by inputting the value VIDEAL to a circuit having the same configuration as the above-described amplitude detection circuit (a single-to-differential conversion circuit, a Gilbert cell mixer, an RC-LPF). Additionally, when the transmission rate is high and when the frequency characteristics of an absolute value circuit 224 are hard to ignore, compensation is possible by switching the polarity of the value VIDEAL by the regenerated clock (CLK) extracted at the decoder 214 and inputting the switched output to the absolute value circuit 224. Additionally, such switching control of the polarity is performed by a reference amplitude generation circuit 222 (FIG. 18).

Heretofore, an embodiment of the present invention has been described. As described above, the separate coding scheme according to the present embodiment separates a data signal into two sets according to the polarity of a clock signal (synchronization signal) being positive or negative, encodes each set independently according to a coding scheme with a DC-free characteristic, and adds the same to the synchronization signal. By using this separate coding scheme, a multilevel signal that is DC-free and the time average of whose amplitude is hardly dependent on the data pattern is generated. As a result, gain control of a VGA can be accurately performed at the receiving side, and data errors can be reduced. Also, by compensating for the frequency characteristics of the amplitude detection circuit provided in the receiving side by a regenerated clock, appropriate gain control of the VGA can be performed even if the transmission rate is high.

<3: Conclusion>

Lastly, the functional configuration of a signal processing apparatus adopting the separate coding scheme of the present embodiment and effects obtained by such functional configuration will be briefly described. Additionally, a part of the mobile terminal 130 described above is an example of the signal processing apparatus. The functional configuration of the signal processing apparatus can be expressed as follows. First, the signal processing apparatus has an encoding unit and a signal generation unit that have functions as described below.

The encoding unit described above is for encoding, according to respective specific coding schemes, a first bit string formed from bit values at odd-numbered positions and a second bit string formed from bit values at even-numbered positions that are obtained by alternately extracting bit values from a bit string that is expressed by mutually different first and second bit values, and generating first and second encoded signals that do not include a DC component. Also, the signal generation unit described above is for generating a multilevel signal by respectively adding, to a clock signal having larger amplitude than the first and second encoded signals that are generated by the encoding unit, the first encoded signal in synchronization with a timing of the clock signal being at a positive amplitude value and the second encoded signal in synchronization with a timing of the clock signal being at a negative amplitude value.

As has been described, the separate coding scheme of the present embodiment relates to the technology for generating a multilevel signal by synchronously adding an encoded signal and a clock. Particularly, its characteristic is that the amplitude level of an encoded signal that is synchronously added at a timing the amplitude level of a clock is positive and the amplitude level of an encoded signal that is synchronously added at a timing the amplitude level of the clock is negative are generated by independent encoding processes. The encoding unit described above has a function of separating data to be encoded into an odd-number bit string and an even-number bit string, and independently encoding each bit string.

That is, even if each encoded signal is synchronously added to the clock, the amplitude characteristics of each signal after the synchronous addition will be same as the amplitude characteristics of each encoded signal. For example, the positive amplitude value of the clock signal is added to the first encoded signal, but since the positive amplitude value of the clock signal is a constant value, the signal after the synchronous addition will be the first encoded signal whose centre of the amplitude is simply shifted. Also, the encoding unit described above performs encoding according to a coding scheme according to which an encoded signal that does not include a DC component is generated. Thus, the absolute amplitude value of a multilevel signal that is generated by the signal processing apparatus described above will be approximately constant when averaged over a time that is not too short in comparison with the clock cycle.

If the time average of the absolute amplitude value does not largely change depending on the period, extremely stable gain control can be performed when using the time average of the absolute amplitude value as a reference value at the time of performing gain control of a VGA at the receiving side. As a result, errors occurring at the time of performing comparison for each amplitude level of a multilevel signal are reduced, and the data error rate can be reduced. As a result, the transmission quality can be improved.

(Notes)

The encoder (encoding unit 152) is an example of the encoding unit and the signal generation unit. The driver 154 is an example of a signal transmitting unit. The receiver 174 is an example of a signal receiving unit. The comparators 204, 206, 208, 210, and 212, and the decoder 214 are examples of an amplitude detection unit. The decoder 214 is an example of a decoding unit. The amplitude comparison operation circuit is and example of a gain control unit. The decoder 214 is an example of a clock regeneration unit. The reference amplitude generation circuit 222, the absolute value circuit 224, and the low-pass filter 226 are examples of are Terence average value calculation unit. The low-pass filter 218 is an example of a filter circuit. The baseband processor 110 is an example of an arithmetic processing unit. The liquid crystal unit 104 is an example of a display unit.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2009-156043 filed in the Japan Patent Office on Jun. 30, 2009, the entire content of which is hereby incorporated by reference.

What is claimed is:

1. A signal processing apparatus comprising:
an encoding unit for encoding, according to respective specific coding schemes, a first bit string formed from bit values at odd-numbered positions and a second bit string formed from bit values at even-numbered positions that are obtained by alternately extracting bit values from a bit string that is expressed by mutually different first and second bit values, and generating first and second encoded signals that do not include a DC component; and
a signal generation unit for generating a multilevel signal by respectively adding, to a clock signal having larger amplitude than the first and second encoded signals that are generated by the encoding unit, the first encoded signal in synchronization with a timing of the clock signal being at a positive amplitude value and the second encoded signal in synchronization with a timing of the clock signal being at a negative amplitude value.

2. The signal processing apparatus according to claim 1, further comprising:
a signal transmitting unit for transmitting the multilevel signal generated by the signal generation unit through a specific transmission path;
a signal receiving unit for receiving the multilevel signal transmitted through the specific transmission path;
an amplitude detection unit for detecting an amplitude value of the multilevel signal received by the signal receiving unit; and
a decoding unit for decoding the first bit string based on a positive amplitude value detected by the amplitude detection unit and decoding the second bit string based on a negative amplitude value.

3. The signal processing apparatus according to claim 2, further comprising:
a variable gain amplifier for amplifying an amplitude of the multilevel signal received by the signal receiving unit; and
a gain control unit for controlling a gain of the variable gain amplifier, wherein the amplitude detection unit detects an amplitude value of the multilevel signal whose amplitude is amplified by the variable gain amplifier, by using a specific threshold value that is determined based on the gain of the variable gain amplifier, and wherein the gain control unit controls the gain of the variable gain amplifier in such a way that a time-averaged value of an absolute amplitude value of the multilevel signal output from the variable gain amplifier matches a reference amplitude value that is determined based on the specific threshold value.

4. The signal processing apparatus according to claim 3, further comprising:
a clock regeneration unit for detecting a polarity inversion cycle of the multilevel signal received by the signal receiving unit, and regenerating the clock signal based on the polarity inversion cycle, wherein the decoding unit decodes the first and second bit strings based on the clock signal regenerated by the clock regeneration unit.

5. The signal processing apparatus according to claim 4, further comprising:

a reference average value calculation unit for modulating a reference amplitude value by the clock signal regenerated by the clock regeneration unit, and calculating a reference average value by time-averaging an absolute amplitude value of the modulation output by a same time constant as the time-averaged value of the absolute amplitude value of the multilevel signal, wherein the gain control unit controls the gain of the variable gain amplifier such that the time-averaged value of the absolute amplitude value of the multilevel signal is a value near the reference average value calculated by the reference average value calculation unit.

6. The signal processing apparatus according to claim 4, wherein the gain control unit includes an absolute value circuit for generating the absolute amplitude value of the multilevel signal output from the variable gain amplifier, a filter circuit for generating the time-averaged value of the absolute amplitude value output from the absolute value circuit, and an operational amplifier to which the time-averaged value output from the filter circuit and the reference amplitude value are input, the operational amplifier being for outputting a control signal that reduces the gain of the variable gain amplifier when the time-averaged value exceeds the reference amplitude value and increases the gain of the variable gain amplifier in case the time-averaged value falls below the reference amplitude value.

7. The signal processing apparatus according to claim 1, wherein one of the specific coding schemes is an AMI (Alternate Mark Inversion) coding scheme.

8. An information processing apparatus comprising:

an encoding unit for encoding, according to respective specific coding schemes, a first bit string formed from bit values at odd-numbered positions and a second bit string formed from bit values at even-numbered positions that are obtained by alternately extracting bit values from a bit string that is expressed by mutually different first and second bit values, and generating first and second encoded signals that do not include a DC component;

a signal generation unit for generating a multilevel signal by respectively adding, to a clock signal having larger amplitude than the first and second encoded signals that are generated by the encoding unit, the first encoded signal in synchronization with a timing of the clock signal being at a positive amplitude value and the second encoded signal in synchronization with a timing of the clock signal being at a negative amplitude value; and an arithmetic processing unit for outputting one or a plurality of pieces of data selected among image data, audio data, communication data, and control data, wherein a bit string of the selected data output from the arithmetic processing unit is input to the encoding unit and the first and second encoded signals are generated, wherein the first and second encoded signals are input to the signal generation unit and the multilevel signal is generated, and wherein the multilevel signal is transmitted through a specific transmission path provided within the information processing apparatus.

9. The information processing apparatus according to claim 8, further comprising:

a signal receiving unit for receiving the multilevel signal transmitted through the specific transmission path;

an amplitude detection unit for detecting an amplitude value of the multilevel signal received by the signal receiving unit;

a decoding unit for decoding the first bit string based on a positive amplitude value detected by the amplitude detection unit and decoding the second bit string based on a negative amplitude value; and wherein, in case the data output by the arithmetic processing unit is the image data, the decoding unit inputs to a display unit the first and second bit strings corresponding to the image data, and the display unit displays the image data based on the first and second bit strings input by the decoding unit.

10. A multilevel coding method implemented on an information processing apparatus including an encoder implemented by a processing hardware, the method comprising the steps of:

encoding, by the encoder, according to respective specific coding schemes, a first bit string formed from bit values at odd-numbered positions and a second bit string formed from bit values at even-numbered positions that are obtained by alternately extracting bit values from a bit string that is expressed by mutually different first and second bit values, and generating first and second encoded signals that do not include a DC component; and generating a multilevel signal by respectively adding, to a clock signal having larger amplitude than the first and second encoded signals that are generated in the step of encoding, the first encoded signal in synchronization with a timing of the clock signal being at a positive amplitude value and the second encoded signal in synchronization with a timing of the clock signal being at a negative amplitude value.

11. A data transmission method comprising the steps of outputting, from an arithmetic processing apparatus, one or a plurality of pieces of data selected among image data, audio data, communication data, and control data, encoding, according to respective specific coding schemes, a first bit string formed from bit values at odd-numbered positions and a second bit string formed from bit values at even-numbered positions that are obtained by alternately extracting bit values from a bit string corresponding to the selected data output from the arithmetic processing apparatus in the step of outputting, and generating first and second encoded signals that do not include a DC component;

generating a multilevel signal by respectively adding, to a clock signal having larger amplitude than the first and second encoded signals that are generated in the step of encoding, the first encoded signal in synchronization with a timing of the clock signal being at a positive amplitude value and the second encoded signal in synchronization with a timing of the clock signal being at a negative amplitude value; and transmitting the multilevel signal through a specific transmission path.

* * * * *